(12) United States Patent
Rogers

(10) Patent No.: US 12,049,733 B2
(45) Date of Patent: Jul. 30, 2024

(54) CONNECTOR

(71) Applicant: Lance Rogers, Cronulla (AU)

(72) Inventor: Lance Rogers, Cronulla (AU)

(73) Assignee: MAX FRANK GMBH & CO. KG, Lieblfing (DE)

( * ) Notice: Subject to any disclaimer, the term of this patent is extended or adjusted under 35 U.S.C. 154(b) by 595 days.

(21) Appl. No.: 17/415,043

(22) PCT Filed: Dec. 20, 2019

(86) PCT No.: PCT/AU2019/051425
§ 371 (c)(1),
(2) Date: Jun. 17, 2021

(87) PCT Pub. No.: WO2020/124165
PCT Pub. Date: Jun. 25, 2020

(65) Prior Publication Data
US 2022/0064873 A1    Mar. 3, 2022

(30) Foreign Application Priority Data

Dec. 21, 2018 (AU) ............................... 2018904920

(51) Int. Cl.
*E01C 11/14* (2006.01)
*E04B 1/04* (2006.01)
(Continued)

(52) U.S. Cl.
CPC .............. *E01C 11/14* (2013.01); *E04B 1/043* (2013.01); *E04B 1/06* (2013.01); *E04B 1/4114* (2013.01);
(Continued)

(58) Field of Classification Search
CPC .......... E04B 1/043; E04B 1/06; E04B 1/4114; E04B 1/483; E04B 5/023; E04B 5/16;
(Continued)

(56) References Cited

U.S. PATENT DOCUMENTS 3,762,027 A * 10/1973 Burtelson ............... E04G 21/12
                                                              403/374.1
4,141,190 A *  2/1979 Shimada ............... E04B 1/4121
                                                                 52/711
(Continued)

FOREIGN PATENT DOCUMENTS

AU       2018/101574 A4    11/2018
WO    WO 2018/071987         4/2018
(Continued)

OTHER PUBLICATIONS

International Search Report and Written Opinion were mailed on Mar. 3, 2020 by the International Searching Authority for International Application No. PCT/AU2019/051425, filed on Dec. 20, 2019 and published as WO 2020/124165 on Jun. 25, 2020 (Applicant—Lance Rogers) (14 Pages).

*Primary Examiner* — Paola Agudelo
(74) *Attorney, Agent, or Firm* — Ballard Spahr LLP

(57) ABSTRACT

A connector is disclosed for use in forming a joint between a first surface and a second surface. The connector comprises a housing. The connector also comprises a tendon. A portion of the tendon can protrude from the housing through a seal. The seal is configured to sealably cover an open end of the housing such that the tendon can move through the seal and laterally sideways across the open end together with at least a portion of the seal. Also disclosed is a connector system for use in forming a joint, and a method of installing a connector to form a joint, between a first surface and a second surface. The connector system and method comprises and makes use of the housing and the tendon.

27 Claims, 26 Drawing Sheets

(51) Int. Cl.

| | | |
|---|---|---|
| | *E04B 1/06* | (2006.01) |
| | *E04B 1/41* | (2006.01) |
| | *E04B 1/48* | (2006.01) |
| | *E04B 5/02* | (2006.01) |
| | *E04B 5/16* | (2006.01) |
| | *E04C 5/12* | (2006.01) |
| | *E04C 5/16* | (2006.01) |
| | *F16B 13/08* | (2006.01) |
| | *F16B 13/12* | (2006.01) |
| | *F16B 13/14* | (2006.01) |
| | *F16B 21/20* | (2006.01) |
| | *F16B 39/02* | (2006.01) |

(52) U.S. Cl.
CPC .............. *E04B 1/483* (2013.01); *E04B 5/023* (2013.01); *E04B 5/16* (2013.01); *E04C 5/12* (2013.01); *E04C 5/165* (2013.01); *F16B 13/08* (2013.01); *F16B 13/12* (2013.01); *F16B 13/141* (2013.01); *F16B 21/20* (2013.01); *F16B 39/021* (2013.01); *F16B 2200/30* (2018.08)

(58) Field of Classification Search
CPC .. E04C 5/12; E04C 5/165; F16B 13/08; F16B 13/12; F16B 13/141; F16B 21/20; F16B 39/021; F16B 2200/30
See application file for complete search history.

(56) References Cited

U.S. PATENT DOCUMENTS

| | | | | | |
|---|---|---|---|---|---|
| 5,134,828 | A | * | 8/1992 | Baur | ...................... E04B 1/4157 |
| | | | | | 52/704 |
| 5,386,675 | A | * | 2/1995 | Baur | ....................... E04B 1/215 |
| | | | | | 52/223.13 |
| 5,415,510 | A | * | 5/1995 | Funaki | ................ E04G 17/0658 |
| | | | | | 52/703 |
| 5,653,078 | A | * | 8/1997 | Kies | ....................... E04B 1/4121 |
| | | | | | 49/504 |
| 6,250,030 | B1 | * | 6/2001 | Sugimoto | ................. E04C 5/12 |
| | | | | | 52/223.1 |
| 2009/0108155 | A1 | * | 4/2009 | Benitez | .................... F16B 13/08 |
| | | | | | 248/217.4 |
| 2010/0199589 | A1 | * | 8/2010 | Law | ....................... F16B 21/16 |
| | | | | | 52/585.1 |
| 2015/0078822 | A1 | * | 3/2015 | Backhaus | ................. E01C 5/06 |
| | | | | | 404/47 |
| 2019/0242114 | A1 | * | 8/2019 | Rogers | .................... E04B 1/483 |
| 2020/0056369 | A1 | * | 2/2020 | Rogers | .................... E04B 1/483 |

FOREIGN PATENT DOCUMENTS

| | | |
|---|---|---|
| WO | PCT/AU2019/051425 | 12/2019 |
| WO | WO 2020/124165 | 6/2020 |

\* cited by examiner

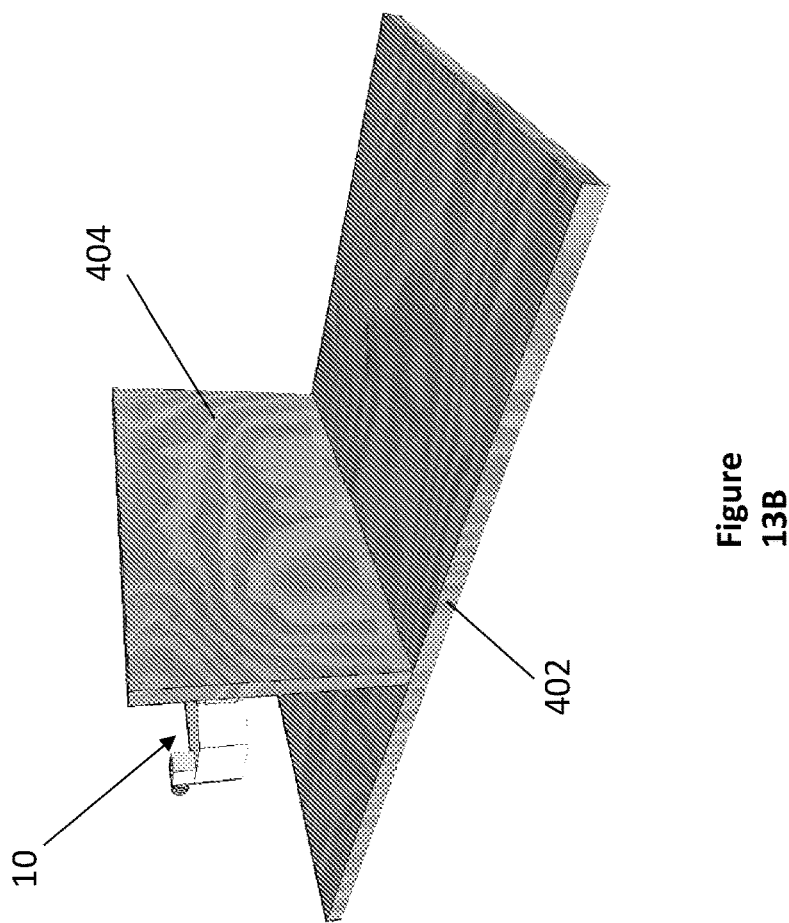
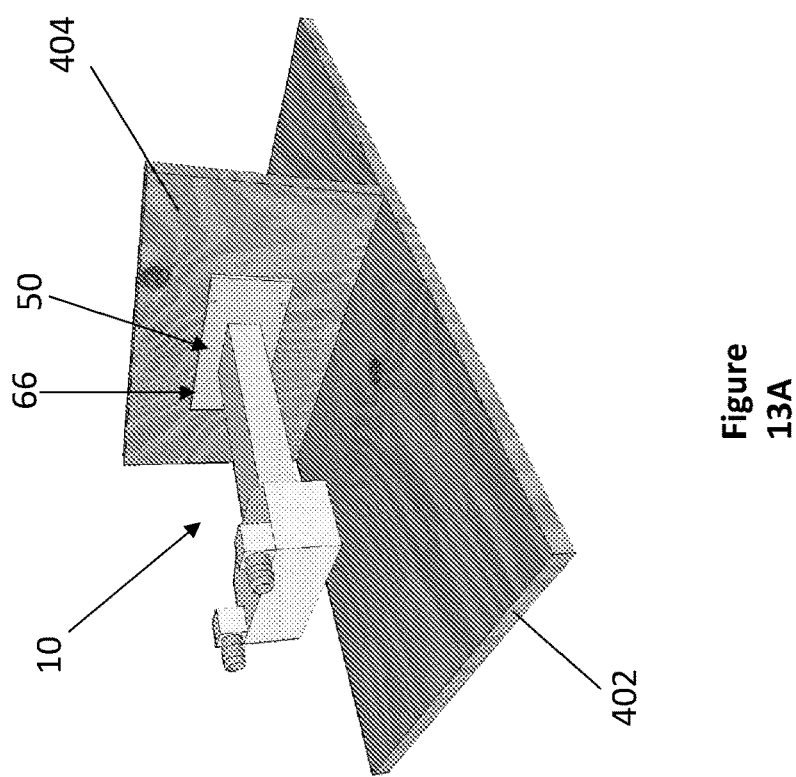
Figure 13A
Figure 13B

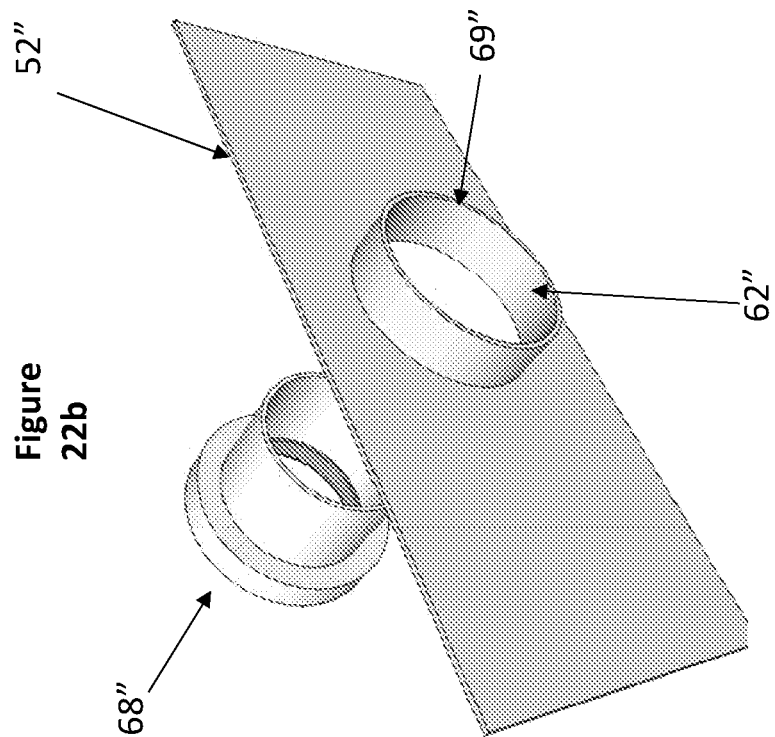
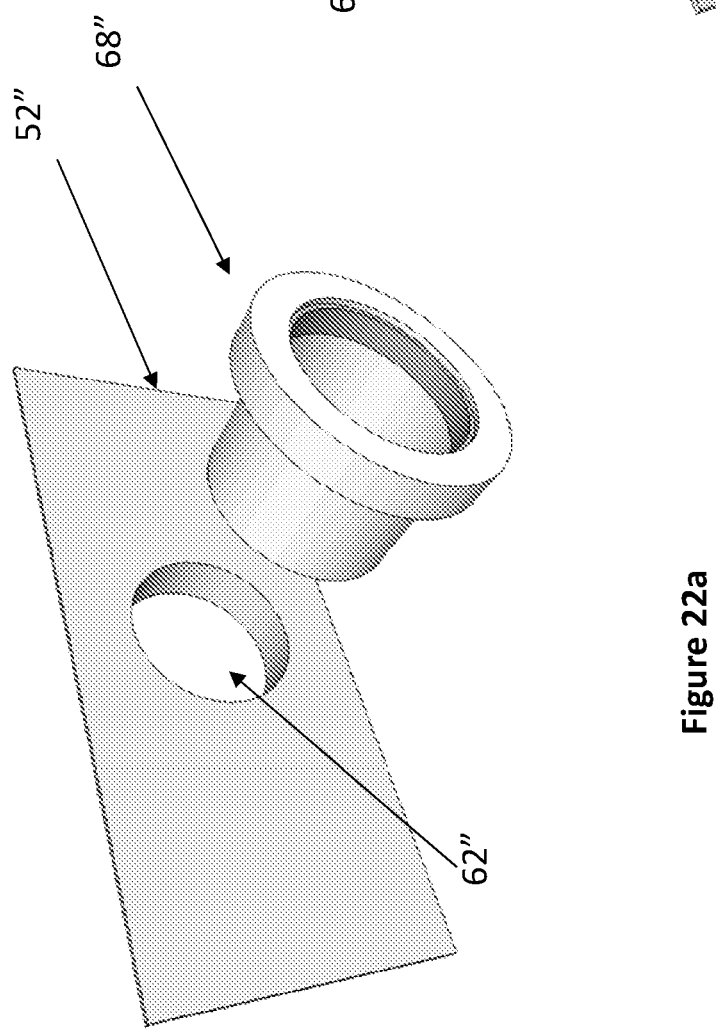
Figure 22b
Figure 22a

CONNECTOR

This application is a U.S. National Phase Application of International Application No. PCT/AU2019/051425, filed Dec. 20, 2019, which claims priority to AU 2018904920, filed December 21, 2018, each of which applications are hereby incorporated by reference in their entireties.

TECHNICAL FIELD

The present disclosure relates generally to connectors for use in forming joints in the building and construction industry.

BACKGROUND OF DISCLOSURE

Post-tensioning is a method of reinforcing (strengthening) concrete or other materials with high strength steel strands or bars, referred to in the art as 'tendons'. For example, a concrete floor plate structure in a building may be post-tensioned to increase the strength, rigidity and integrity of the building. Post-tensioning is used in multi-storey buildings or in buildings where the floors are intended to have long spans uninterrupted by vertical pillars.

When pouring a building floor as a single plate of cementitious material, the floor is formed by making the floor in sections or individual slabs, which are poured at different times to each other and interconnected by suitable tendons such as wire cables or rods, to form the more or less continuous flooring. After pouring and during curing, the individual sections of the floor tend to move with respect to each other as the building settles. This means that the joint connecting the sections or slabs must be capable of accommodating this relative movement. Further, pre-compression forces exist in each of the sections or slabs, on either side of the joint. These internal forces in the sections or slabs result in the sections or slabs contracting, to thereby open up the joint laterally (i.e. in longitudinal and lateral-sideways directions).

Temporary movement connectors are known which incorporate a tendon, which connectors provide a joint between adjacent sections or slabs, and which connectors accommodate relative movement between such adjacent sections or slabs (i.e. as a result of the pre-compression forces existing in each of the sections or slabs). The tendons of such temporary movement connectors may be post tensioned.

In this regard, each temporary movement connector can accommodate the relative movement of individual floor sections or slabs, before the joint (i.e. connector) is locked by the various sections and components of the temporary movement connector being sealed to one another permanently. Once the temporary movement connector is sealed, the permanent post-tensioned floor can provide a more or less continuous floor or similar of the building. However, if there is insufficient or poor transfer of post tensioning pre-compression forces and that also result in differential movement between adjacent sections/slabs, and prior to the temporary movement connector being locked, the sections/slabs can be at risk of cracking which can thereby reduce the longevity and the integrity of the resulting floor plate.

Some prior art temporary movement connectors have attempted to address the significant difficulty in sealing the connector prior to locking. In some temporary movement connectors, inadequate sealing of hollow components of the connector may allow the ingress of concrete or cement fines into the connector prior to post-tensioning. This may inhibit the temporary movement connector from performing as designed and may result in a weak joint.

For example, some prior temporary movement connectors have made use of a sealing screen incorporating a flexible elastic membrane that bridges between a female housing and male positioner. The female housing may be cured into a first surface and the male positioner may be cured into a second surface along with a dowel bar, the dowel bar passing through the male positioner into the female housing. The male positioner may have an aperture comprising a sealing ring that is adapted to sealingly engage the dowel bar and may thus prevent concrete or cement fines from entering the connector through the aperture. In use, because the male positioner is cured into the same surface as the dowel bar, the two components do not move relative to one-another. Thus, to the accommodate for any lateral, vertical or telescopic movement between the two surfaces relative to one-another, the flexible elastic membrane that bridges between the male positioner and female housing may flex to allow for relative movement between the male positioner and female housing, whilst maintaining the sealed connection between the components of the temporary movement connector around the dowel prior to locking.

One issue that may arise from such prior art temporary movement connectors, is that the elastic membrane can be prone to failure whilst adapting to the relative movement of the components of the connector. For example, the elastic membrane may become worn and tear when stretched telescopically.

A further issue that has arisen in some prior art temporary movement connectors has been the inability to reliably inhibit the dowel bar and/or connector housing from failing in tension force transfer once it has been locked. In some forms, the dowel bar has been provided with a locking pin that engages a slot along the dowel, the locking pin is then surrounded by grout to lock the dowel bar in tension and shear transfer to the grout. In other forms, at least one of the dowel bar and dowel bar housing have been provided with ribs therealong internally and externally to the housing. These ribs are surrounded by grout when the dowel bar is locked within the temporary movement connector. However, one issue that has arisen from such prior art temporary movement connectors is that the locking pin, ribs, and cementitious material that surrounds the locking pin and/or ribs may be prone to shearing or fracturing due to the significant tension forces arising from relative movement of the adjacent sections/slabs. This may result in either the dowel bar or the entire temporary movement connector failing.

It is to be understood that, if any prior art publication is referred to herein, such reference does not constitute an admission that the publication forms a part of the common general knowledge in the art, in Australia or any other country.

SUMMARY OF DISCLOSURE

Disclosed herein is a connector for use in forming a joint between a first surface and a second surface. The first and second surfaces may be defined by sections, slabs or plates that may be formed adjacent to one-another, with the connector acting as a moveable bridge therebetween. Typically, at least one of the adjacent sections, slabs or plates is horizontal (e.g. a forming part of the floor). Prior to locking, the connector to allows a temporary release of restraining effects of the surfaces relative to one another (i.e. the connector allows for differential movement of the surfaces relative to one another). This may assist in ensuring that the maximum amount of post-tensioning pre-compression force can be transferred into the surfaces prior to being locked.

The connector comprises a housing and a dowel bar, hereafter referred to as a tendon. When the tendon is installed within the housing, a portion of the tendon protrudes from the housing through a seal. The seal is configured to sealably cover an open end of the housing around the tendon such that, prior to the connector being locked, the seal protects against the ingress of grout and/or cementitious material into the housing through the open end. Furthermore, the seal is configured such that, prior to locking, the tendon can move through the seal and laterally sideways across the open end together with at least a portion of the seal.

Thus, said at least a portion of the seal is able to seal the housing open end and to seal around the tendon, and yet the tendon can move the portion of the seal laterally across the open end, and further the tendon can be moved longitudinally through the seal at the open end. As set forth herein, because the tendon moves said at least a portion of the seal laterally across the open end, and because the tendon can move longitudinally through the seal, said at least a portion of the seal is able to be configured in a more robust and reliable format (e.g. some or all of the seal may primarily be constructed of a high strength and durable material, such as a metal, metal alloy, composite, etc.). This contrasts the present seal with the known and less reliable flexible elastic membranes of the prior art.

In an embodiment, the seal may solely comprise a sealing element that is configured to be retained within a sleeve. In another embodiment, the seal may comprise both the sealing element and the sleeve, in which case the sealing element may define the portion of the seal that moves laterally sideways together with the tendon.

In either case, the sleeve may be affixed at the open end of the housing. Thus, the sleeve, together with the sealing element, can close the housing open end. Further, the lateral sideways movement of the tendon causes the sealing element to be laterally displaced within and relative to the sleeve. Longitudinal movement of the tendon relative to the housing may be accommodated for by the tendon passing through the sealing element into or out of the housing. Further, the sleeve can restrain the sealing element against moving longitudinally together with the tendon. This arrangement may further improve the reliability and robustness of the seal by removing the need for the seal to move along more than one plane (e.g. laterally and telescopically like the flexible elastic membranes of the prior art) relative to the housing. In other words, the present arrangement is such that the sealing element is constrained by the sleeve to move only in one plane.

In some embodiments, the sealing element may be retained captively within the sleeve. In some embodiments, the sealing element may comprise a flat plate that is configured to move laterally with the tendon in use. In some embodiments, in use, the housing may be embedded within a cured first surface such that the open end of the housing and/or the sleeve is contiguous with a face of the surface (i.e. the housing open end is accessible). In such embodiments, only the portion of the tendon that protrudes from the housing through the seal may become embedded within an adjacent cured second surface. By reducing the number of moving components, the connector may be more robust and may perform more consistently.

In an embodiment, a semisolid or pseudo-plastic fluid may be arranged between the sealing element and the sleeve such that a grout and/or cementitious material is prevented from flowing through the seal between the sleeve and the sealing element. Thus, the semisolid or pseudo-plastic fluid may form part of the "seal". In an embodiment, the semisolid or pseudo-plastic fluid may be grease. A semisolid or pseudo-plastic fluid may also advantageously reduce frictional resistance between the sealing element and the sleeve, thus enabling the sealing element to slide laterally sideways more easily within the sleeve when moved by the tendon.

In an embodiment, the sealing element may comprise an aperture therethrough that is closely dimensioned so as to sealably engage the tendon, whilst permitting the tendon to slide longitudinally back-and-forth therethrough in use. Thus, the closely dimensioned aperture can form a part of the "seal". Hence, prior to the connector being locked (e.g. by grout), the closely dimensioned aperture may protect against the ingress of grout and/or cementitious material into the housing through the open end whilst not inhibiting longitudinal movement of the tendon relative to the housing or the seal. In some embodiments, the aperture may comprise an O-ring around its perimeter, with the O-ring being adapted to sealably engage the tendon. Thus, the O-ring can also form a part of the "seal".

In some embodiments, when the sealing element is a flat plate, it may be formed from a stiff and/or rigid material, whereas the O-ring may be formed from a flexible and/or resilient material. The flexible and/or resilient material of the O-ring may in some embodiments be formed from an elastomeric material such as a rubber. The rubber may still have sufficient rigidity to resist deformation when a lateral force is applied by the tendon against the rim of the O-ring.

In some embodiments the flat plate may be formed from metal. In some embodiments, the flat plate and O-ring may be made of the same material, or may be configured to form a single body. In some embodiments, when the flat plate and tendon are formed from metal, there may be a metal-to-metal connection between the flat plate and tendon.

Also disclosed is a connector for use in forming a joint between a first surface and a second surface, wherein the connector comprises a housing and a tendon. When the tendon is installed within the housing, a first portion of the tendon is retained within the housing, and a second portion of the tendon protrudes from the housing through a seal. The tendon first portion has a configuration such that the tendon first portion cannot pass out of the housing via the seal and is thus retained within the housing. Once the tendon first portion has been inserted into the housing through the seal and configured, the configured tendon first portion prevents the removal of the tendon first portion back through the seal. Thus, even prior to locking of the tendon, the tendon may be configured in such a manner that it is restricted from being pulled out of the housing through the seal, whilst still permitting some lateral and longitudinal movement of the tendon within the housing. Unlike a tendon that relies on ribs that are integrally formed therealong to grip the surrounding grout when locked, or a locking clip which remains loose until set in place by the surrounding grout (and may still be prone to failure such as shearing), the configured tendon first portion is able to prevent removal of the tendon even prior to locking of the tendon. The configured tendon first portion may thus improve the overall reliability of the connector.

The configuration of the tendon first portion may involve a fastening, screwing, bolting, clipping, welding or other means of deforming and/or securing another component to the tendon. The configuration of the tendon first portion may involve a formation that is integral (e.g. integrally formed) with a remainder of the tendon.

For example, in an embodiment, the configuration of the tendon first portion may comprise an enlarged formation that is located at or is of the tendon. The enlarged formation may be of a size and/or shape such that the enlarged formation prevents the tendon first portion from passing out of the housing (e.g. via the seal).

In an embodiment, the housing may comprise a passage that extends from the seal. The housing may also comprise a chamber located along the passage (e.g. at an end of the passage). The chamber can be adapted such that the configured tendon first portion is retained within the chamber. Thus, in such embodiments, the movement of the tendon through the seal may be restricted by the range of longitudinal motion of the configured tendon first portion within the chamber. For example, in embodiments where the configuration of the tendon first portion is an enlarged formation, the enlarged formation may be of a size and/or shape such that it is prevented from being removed from within the chamber. By way of further example, when the enlarged formation is moved towards a surface of the chamber that is adjacent the passage, the enlarged formation may interact with the surface of the chamber and may thus be prevented from entering partly or wholly into the passage.

In an embodiment, the seal may be located at one end of the passage and the chamber may be located at an opposite end of the passage. The tendon may thus extend through the passage between the chamber and seal. In an embodiment, the enlarged formation may be located at the end of the tendon first portion.

In an embodiment, the enlarged formation may be an anchor block dimensioned such that it is prevented from moving through the passage. However, the anchor block may be dimensioned such that it is able to move longitudinally and laterally within the chamber along with movement of the tendon. A tension load on the tendon may thus be converted into a compression load, either when the anchor block contacts the chamber wall, or when surrounding grout (or cementitious material) that is later added into the chamber to lock the tendon therein holds captive (i.e. locks) the anchor block. This compression load can thus be dispersed between the anchor block, the surrounding grout/cementitious material (when present), the chamber wall and the surrounding surface (e.g. floor/wall slab) in which the connector is embedded.

For example, in embodiments when the anchor block and chamber are made from steel, and once grout/cement has been added into the chamber, the tensile load applied to the tendon may be initially distributed into the grout/cement to be compressed between the anchor block and the chamber wall, with this load then further distributed out of the chamber to the surrounding surface (i.e. into the section/slab/plate that surrounds the exterior surface of the chamber). The configuration is such as to convert tensile load applied to the tendon into a compressive load, whereby the likelihood of failure of the connector may be reduced, as grout (and cementitious material in general) has increased performance when under compressive loads than when under tensile or shear loads.

In some configurations of the anchor block, a portion of the anchor block may enter the passage, however, typically the anchor block may be of a size and/or shape such that the whole anchor block is prevented from entering and passing through the passage.

In an embodiment, the anchor block may comprise a first contact face that forms a plane that is angled with respect to a longitudinal axis of the tendon. The first contact face may be adapted to oppose so as to engage a corresponding interior facing wall of the chamber that is located adjacent to an opening between the passage and chamber. The angled plane of the first contact face may widen the anchorage field (i.e. contact surface area) of a compression load applied by the anchor block. This may have the effect of further improving the reliability and general performance of the connector.

In an embodiment, the anchor block may be symmetrical across the tendon longitudinal axis. The first contact face may thus comprise respective angled planes located on opposite sides of the tendon longitudinal axis. In an embodiment of the anchor block, the angling of the angled plane may be in the range of 30-90 degrees, and optimally 30-60 degrees, to the tendon longitudinal axis. As described in detail later, such an angle range can widen the resistance field outside of the connector so that it is not so focused in the surrounding concrete. When the first contact surface has an angled plane in this range, the resistance field of compression may be increased when compared to higher or lower angles. In an embodiment, the enlarged formation may be adapted such that a tensile force applied the tendon can be transferred via the enlarged formation to the housing as a compression force.

In an embodiment, the anchor block may further comprise a second contact face that is substantially flat and that extends orthogonally with respect to a longitudinal axis of the tendon. The second contact face may be adapted to oppose so as to engage an interior facing rear wall of the chamber located on an opposite chamber side to the opening. For example, prior to grouting/locking, and when the anchor block is at a rearmost position within the chamber, it may thus slide laterally along the rear wall of the chamber in correspondence to a lateral sideways movement of the tendon within the seal.

In an embodiment, grout may be located, in use, within the chamber to surround and capture the enlarged formation such that a lateral and/or longitudinal movement of the second surface relative to the first surface is restricted. Typically, the grout is employed once the first and second surfaces (e.g. sections, slabs or floor plates) have sufficiently settled/cured/come to rest. In an embodiment, the housing may have an inlet configured such that a grout can flow therethrough (e.g. be injected therethrough) into the housing, and an outlet configured such that a grout can flow therethrough out of the housing. In an embodiment, at least one of the inlet and/or the outlet are arranged at an upper portion of the chamber.

In an embodiment, the grout that is introduced into the chamber can comprise a dense fluid such as a mixture of water, cement, and sand. In an embodiment, the grout may be the same as the concrete used for forming the section/slab/plate, or it have a different formulation and consistency.

Also disclosed is a connector system for use in forming a joint between a first surface and a second surface. The connector system comprises a housing and a tendon. When the tendon is installed within the housing, a first portion of the tendon is retained within the housing, and a second portion of the tendon protrudes from the housing through a seal. The seal is configured to sealably cover an open end of the housing such that the tendon can move through the seal and laterally sideways across the open end together with at least a portion of the seal. Furthermore, the tendon first portion has a configuration such that the tendon first portion cannot pass out of the housing via the seal. The connector system may in some embodiments comprise various of the features of the connector as set forth above.

Also disclosed is a method of installing a connector for use in forming a joint between a first surface and a second surface. The connector comprises a housing and a tendon. A seal is configured to sealably cover an open end of the housing such that, when installed and prior to locking, the tendon can move through the seal and laterally sideways across the open end together with at least a portion of the seal. The method comprises:

installing the housing such that the seal locates adjacent to a formwork;
pouring and curing the first surface, the first surface being located along a first side of the removable formwork;
removing the formwork such that the seal is exposed;
installing the tendon such that a portion of the tendon protrudes from the housing through the seal;
pouring and curing the second surface, the second surface being located along a side of the first surface from which the tendon protrudes.

The method need not be performed strictly in this order. For example, the tendon can become embedded into the cured second surface prior to being inserted into the housing (and prior to the housing being embedded into the cured first surface). Further, the housing and tendon can be assembled through the formwork and the surfaces cured simultaneously.

In an embodiment, the method may further comprise allowing the first and second surfaces to move laterally and/or longitudinally relative to one another (e.g. up until the first and second surfaces have each sufficiently settled/cured/come to rest). During such movement, the housing is captive to and thus moved by the first surface, and the portion of the tendon that protrudes from the housing through the seal is captive to and thus moved by the second surface. Because the tendon is not fully fixed against movement with respect to the housing, a seal may therefore be employed that is more robust, with improved reliability and longevity.

In an embodiment, the method may further comprise locking the connector such that the first and second surfaces are restricted from moving laterally and/or longitudinally relative to one another (e.g. once the first and second surfaces have each sufficiently settled/cured/come to rest). The connector used in the method may comprise various of the features of the connector as set forth above.

BRIEF DESCRIPTION OF DRAWINGS

Various forms of the connector, system and method will now be described, by way of example only, with reference to the accompanying drawings in which:

FIG. 13A and 13B are alternate perspective views of the housing of the connector of FIG. 1 when installed on a first side of vertical formwork.

FIG. 22A is an exploded perspective view from a forward position of a further of embodiment of a sealing plate.

FIG. 22B is an exploded perspective view from a rearward position of the sealing plate of FIG. 22A.

DETAILED DESCRIPTION OF SPECIFIC EMBODIMENTS

Figure 1:
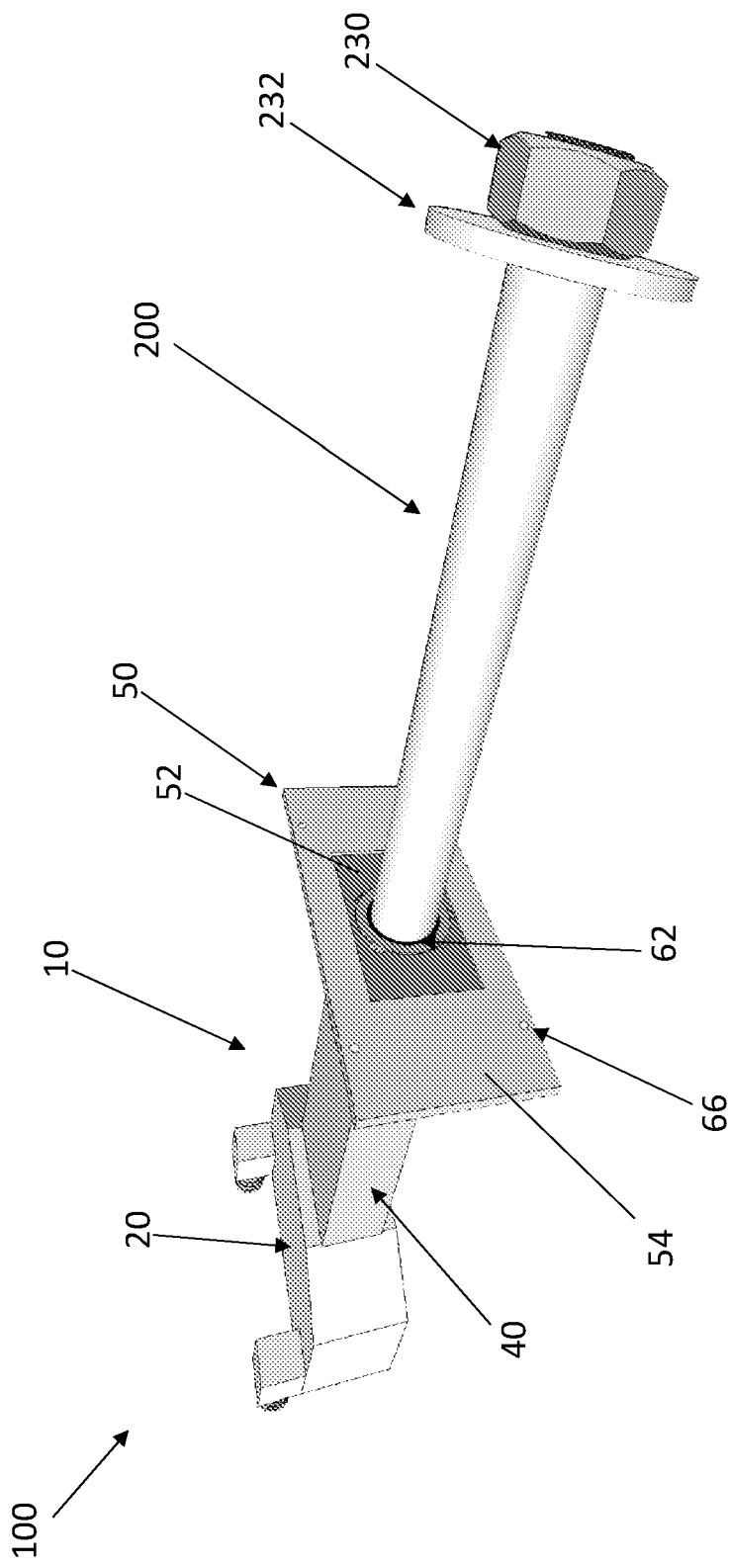
FIG. 1 is a perspective view of an embodiment of a connector.
Figure 2:
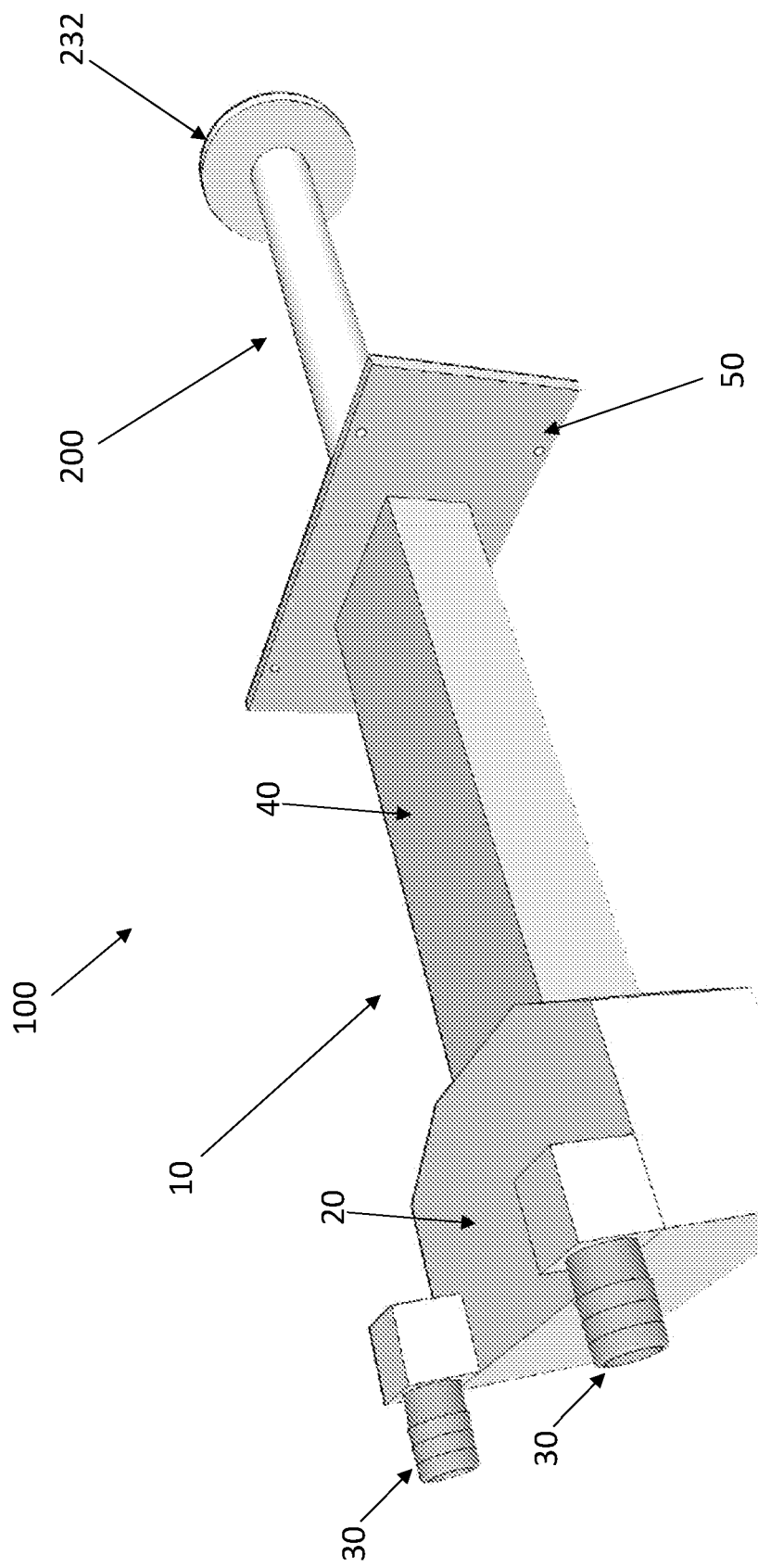
FIG. 2 is an alternate perspective view of the embodiment of the connector of FIG. 1.

In the following detailed description, reference is made to accompanying drawings which form a part of the detailed description. The illustrative embodiments described in the detailed description, depicted in the drawings and defined in the claims, are not intended to be limiting. Other embodiments may be utilised, and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Referring generally to the drawings, an improved temporary movement connector is shown in two forms, namely, a connector 100, as illustrated variously in FIGS. 1 to 16, and a connector 100', as illustrated variously in FIGS. 17 to 20. The connector 100,100' comprises a housing 10,10' and a tendon in the form of a dowel bar 200. The temporary movement connector is employed to join and then to transfer forces that arise as a result of differential movement between adjacent sections/slabs/plates as they settle and cure and to transfer long term forces after locking. The connector is typically though not exclusively employed in the construction of a multi-storey building that has large floor spans.

In use, as illustrated in FIGS. 13 to 16, the housing 10 can become embedded into in a first surface 400 (e.g. a first slab) as it cures, whilst the dowel 200 can become embedded into an adjacent second surface 410 (e.g. a second adjacent slab) as it cures. The first 400 and second 410 surfaces can take the form of sections, slabs, or plates that may be formed adjacent to one-another, with the connector 100 acting as the joint therebetween. The surfaces 400,410 may be any two adjacent surfaces that may require post-tensioning. For example, in some applications, the first 400 and second 410 surface can be two adjacent floor slabs. In other applications the first 400 and second 410 surfaces can be a floor slab located adjacent to a vertical wall slab respectively.

Prior to locking the connector 100, typically by filling the housing 10 with grout, the connector 100 can act as an adjustable joint, whereby the housing 10 and tendon 200 are able to move relative to one another laterally and or longitudinally (within the pre-designed structural constraints of the connector 100), thus allowing for a temporary release of the restraining effects of the surfaces 400,410 relative to one another. This may assist in ensuring that the maximum amount of post-tensioning pre-compression forces or shrinkage or creep forces can be transferred into the surfaces 400,410 before they are locked together.

Figure 4:
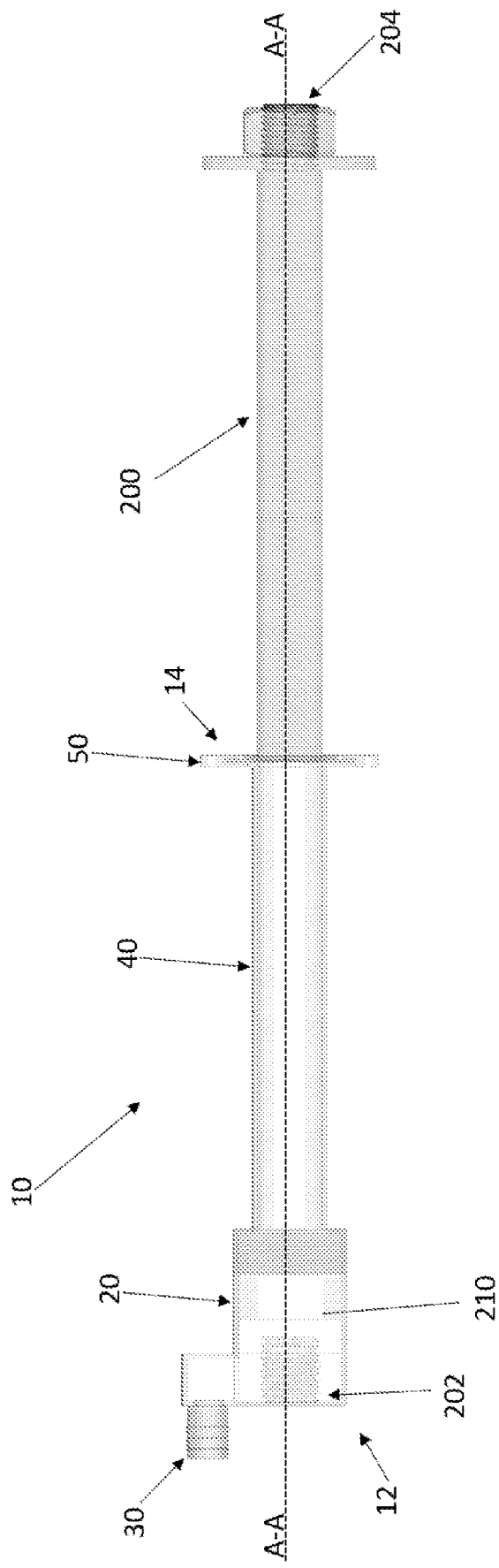
FIG. 4 is a partially transparent side view of the embodiment of the connector of FIG. 1, wherein the anchor block is at its rearmost position in the chamber.
Figure 5A:
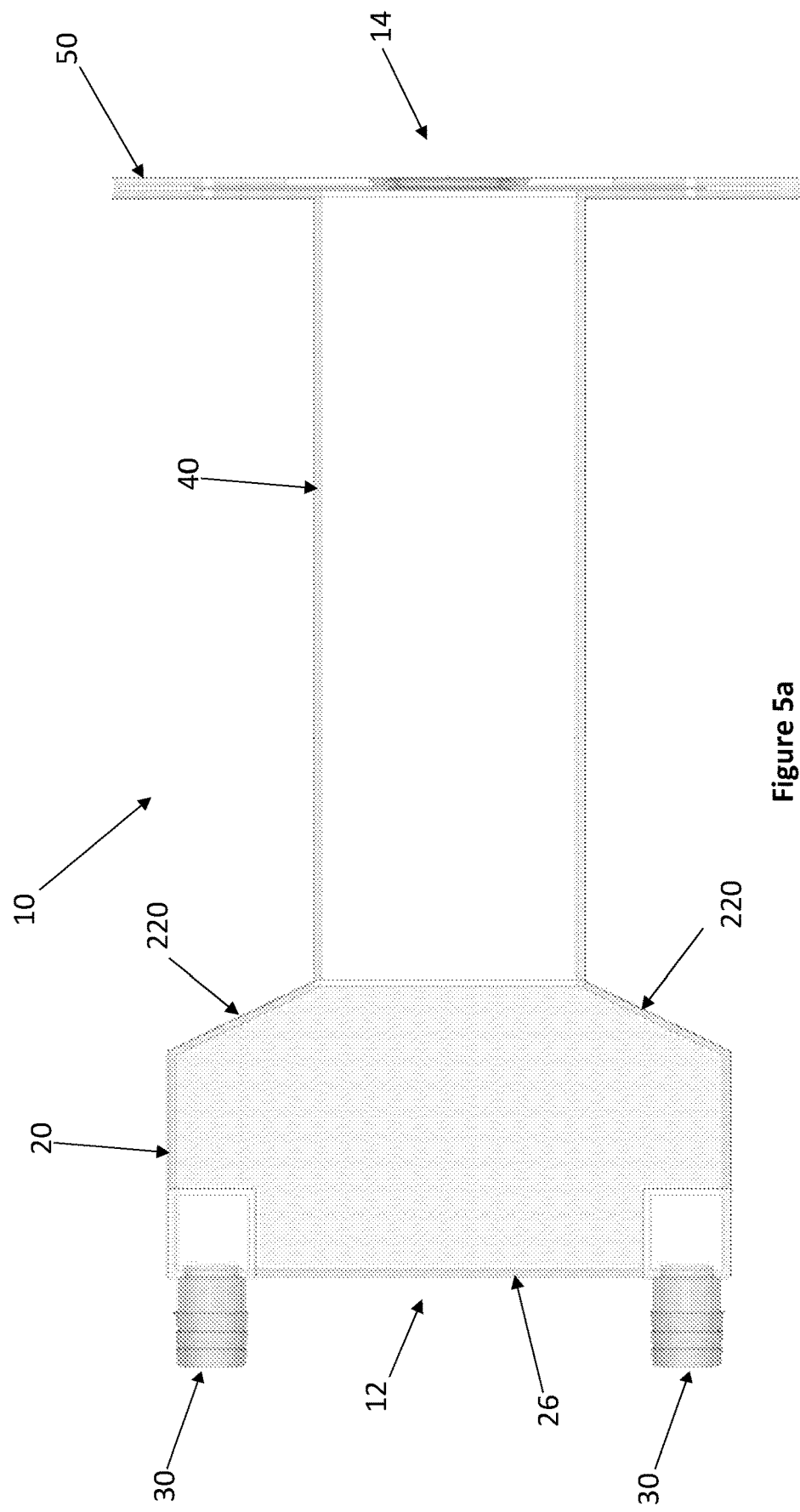
FIG. 5A is a partially transparent top view of a housing of the connector of FIG. 1.
Figure 5B:
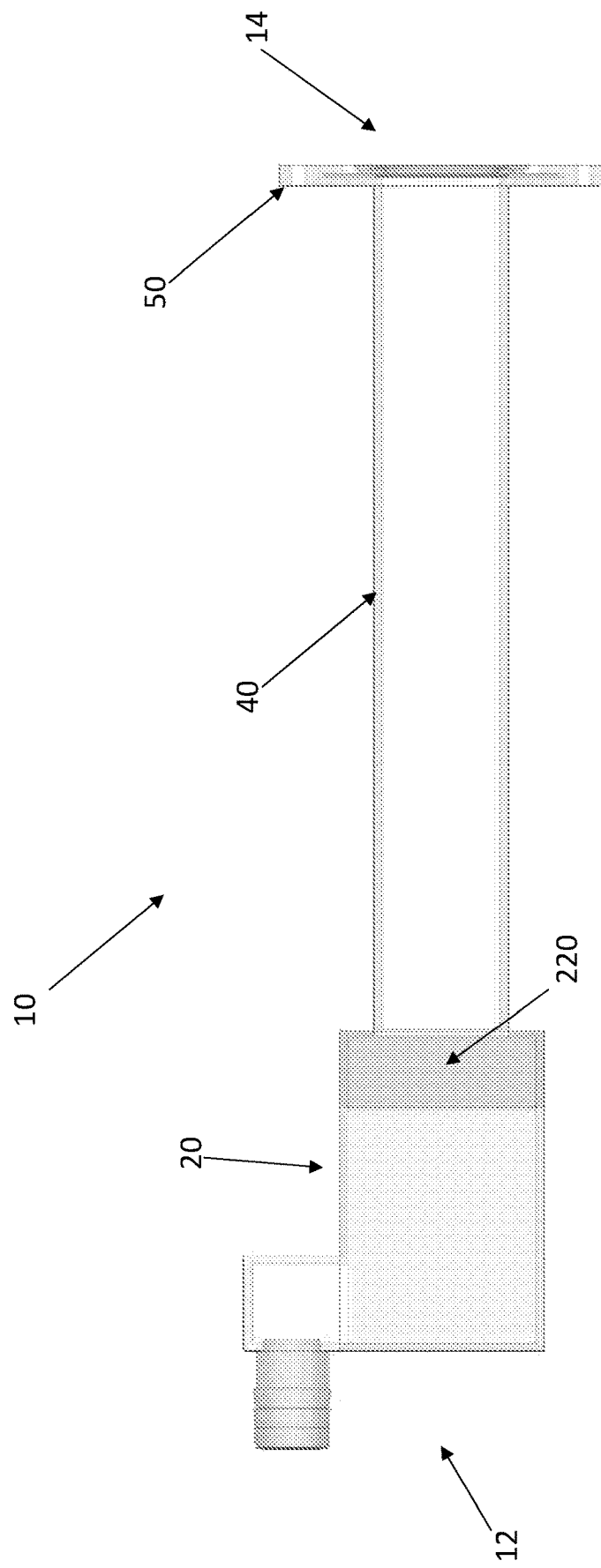
FIG. 5B is a partially transparent side view of the housing of FIG. 5A.

In the embodiment illustrated in FIGS. 1 to 16, the housing 10 is adapted to form a hollow shaft between a housing open end 14 and a housing anchor end 12. As best seen in FIGS. 5*a* and 5*b*, a passage 40 extends between a seal 50 (i.e. that is located at the open end 14 of the housing 10) and a chamber 20 located at the anchor end 12 of the housing 10. The housing 10 can be made of a metallic material, such as steel, which may improve the fire resistance of the connector 100. Metallic materials may also improve the longevity of the connector 100 and reduce instances of failure during installation and post-tensioning of the connector 100.

Figure 7:
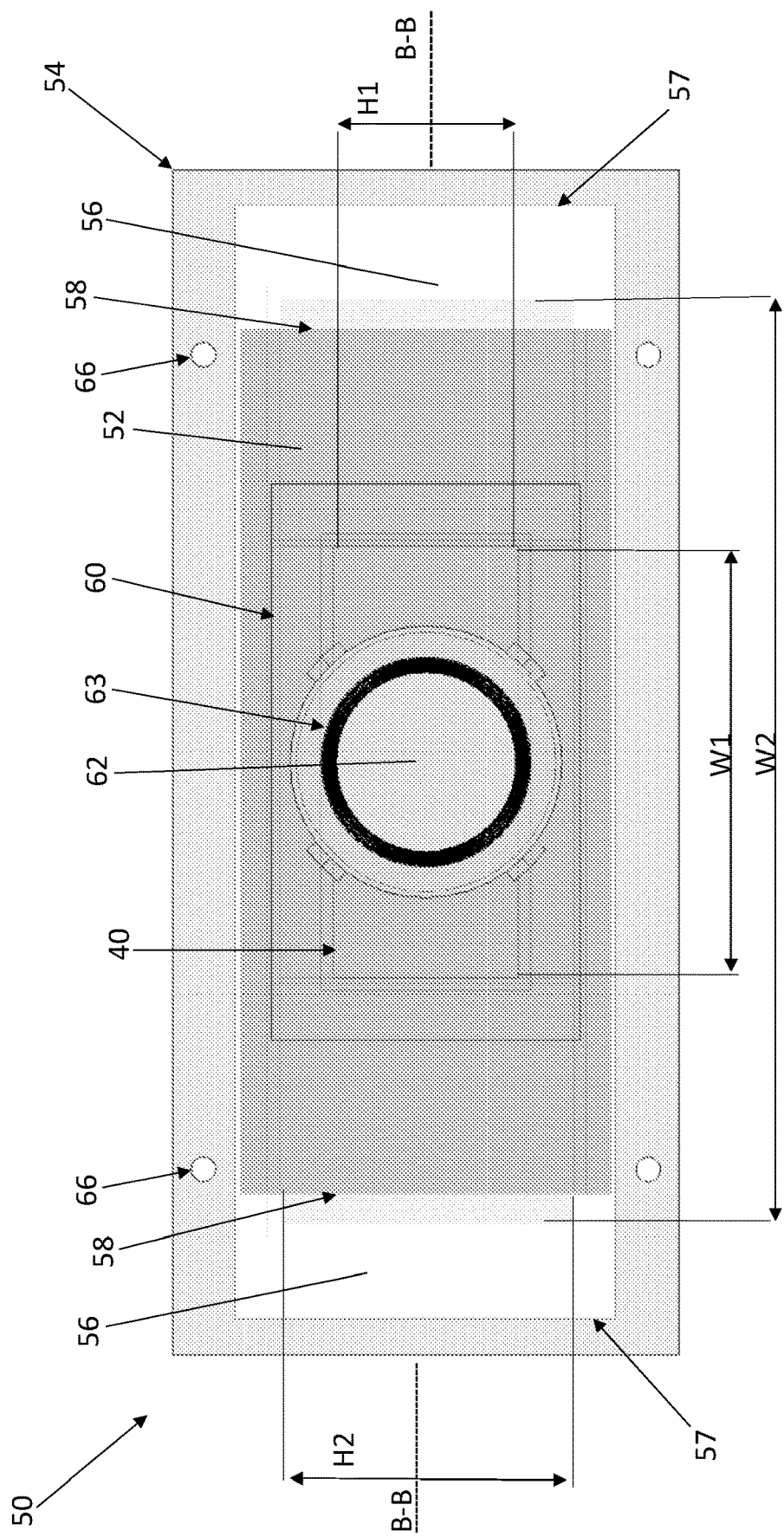
FIG. 7 is a partially transparent front view of a seal of the connector shown in FIG. 1.
Figure 8:
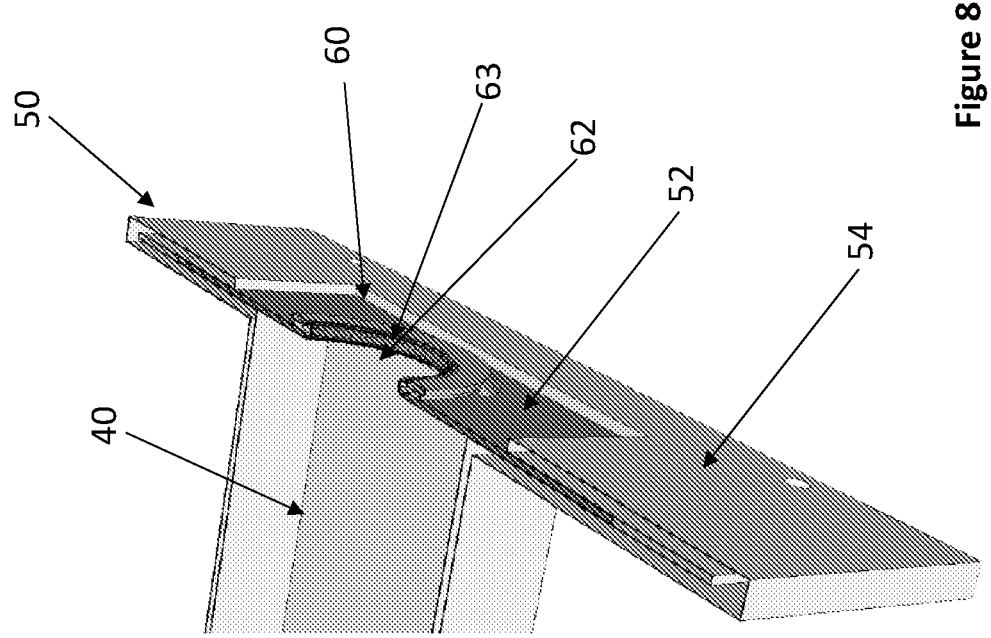
FIG. 8 is a perspective sectional detail of an end of the housing and a portion of the seal, taken along the line B-B of FIG. 4.

The passage 40 has a generally rectilinear cross-section therealong, although in other embodiments the cross-section may be formed into other suitable shapes such as circular, ovular, or square. As best illustrated in FIG. 7, the passage 40 can have an internal cross-sectional height H1 that corresponds to the diameter of the dowel 200. In use, a dowel 200 that has been inserted through the passage 40 may thus be substantially restrained from moving up or down in a vertical direction. The passage 40 also has an internal cross-sectional width W1 that can be adapted to correspond with the desired range of lateral movement of the dowel 200 with respect to the housing 10, prior to locking. For example, in an embodiment where the joint is to be allowed a lateral tolerance of 20 mm to either side of a central longitudinal axis A-A of the connector 100; the total internal width W of the passage 40 can be the diameter of the dowel 200 plus 40 mm. A person skilled in the art would appreciate that the connector 100 is scalable and can be manufactured to any size to suit the specific constraints for the joint as specified by a structural engineer or similar person skilled in the art.

The seal 50 comprises a sealing element in the form of a sealing plate 52 that is captively retained within a sleeve 54, the sleeve 54 being mounted at the open end 14 of the housing 10. As set forth above, the seal 50 may solely comprise the sealing plate 52, or the seal may be defined by a combination of the sealing plate 52 and sleeve 54, etc.

The sleeve 54, as illustrated in FIGS. 1 to 10 and 12, can comprise two metallic plates that, when joined together (e.g. by welding), are arranged such that a contained pocket 56 is formed therebetween. To assist with fastening the housing 10 to formwork prior to curing of the first surface 400, such as vertical formwork 404 as seen in FIG. 13A, the sleeve 54 can be provided with one or more holes 66 therethrough that are spaced around the distal edges of the sleeve 54. Thus, a suitable formwork fastener can be driven through each such hole 66.

The sleeve 54 is arranged to have a window 60 formed in its external face such that the sealing plate 52 is exposed therethrough. The window 60 can be substantially rectangular in shape, having a vertical height sufficient for the tendon to protrude therethrough and a lateral width that generally corresponds to the desired range of lateral movement of the dowel 200.

The sealing plate 52 is flat and has an external profile that closely corresponds to the inner walls of the pocket 56, but such that the plate is configured to be laterally slideable within the pocket. The sealing plate 52 has a lateral width and vertical height that is larger than that of the window 60 such that the sealing plate 52 overlaps with the internal faces of the sleeve 54 (i.e. that face into the pocket 56).

A semisolid or pseudo-plastic fluid such as grease can be applied to the external surface of sealing plate 52 such that it forms a barrier across any gaps that may form between the sealing plate 52 and the internal faces of pocket 56 of sleeve 54. The barrier of semisolid or pseudo-plastic fluid can thus prevent grout and/or cementitious material from flowing through the seal 50. The semisolid or pseudo-plastic fluid can also facilitate the lateral sliding of plate 52 within the pocket 56.

The sealing plate 52 can be formed to have a height that generally corresponds to the height of the pocket 56 such that the sealing element 52 cannot slide up or down vertically within the pocket 56 but is still able to slide laterally within and along the width of the pocket 56. As with the passage 40, the relative widths of the pocket 56 and sealing plate 52 can be designed to allow the sealing plate 52 to slide a distance laterally sideways within the pocket 56 of sleeve 54, with the distance corresponding to the desired range of lateral movement of the dowel 200 with respect to the housing 10 (i.e. prior to locking of the tendon within the housing). For example, in an embodiment where the joint is to be allowed a lateral tolerance of 20 mm to either side of a central longitudinal axis A-A of the connector 100—the distance between the internal walls 57 of the pocket 56 and the side walls 58 of the sealing plate 52 when centred can be 20 mm on either side of the sealing plate 52.

An aperture 62 can be centrally located in the sealing plate 52, the aperture 62 being aligned vertically with the central longitudinal axis A-A such that, in use, a dowel 200 can move therethrough and into the passage 40 of the housing 10. The aperture 62 can be dimensioned to substantially correspond to the diameter of the dowel 200 so as to sealably engage the dowel 200 in use, whilst still permitting the dowel 200 to slide back-and-forth therethrough. The aperture 62 can comprise an O-ring 63 around its perimeter that may assist with creating a close seal between the sealing plate 52 and the dowel 200.

In some embodiments, the O-ring 63 can be formed from a deformable yet resilient material that contrasts with the generally stiff/rigid material of the sealing plate 52. For example, the O-ring 63 can be formed from an elastomeric material such as a hard rubber and the sealing element 52 from a metal. In some embodiments, both the O-ring 63 and the sealing plate 52 can be made from a generally stiff/rigid material that is substantially inelastic, such as a metal or a carbon fibre/composite, with the O-ring toleranced to seal against the dowel 200 such that grout cannot pass therebetween, yet without restricting the dowel 200 from being able to move longitudinally therethrough. In some embodiments, the sealing plate 52 can be configured to seal directly against the dowel 200. The passage 40, the aperture 62, and the sealing plate 52 in pocket 56 can, in combination, maintain the longitudinal axis of the dowel 200 to remain aligned with or substantially parallel to the central longitudinal axis A-A in use.

Thus, the seal 50 is configured to sealably cover the open end 14 of the housing 10 and to seal around the dowel 200. In use, the tendon first portion 202 is inserted through the seal 50 such that the tendon second portion 204 protrudes from the housing 10. In use, the dowel 200 can engage the aperture 62 so as to move the sealing plate 52 laterally sideways across the open end 14 of the housing within the pocket 56 of sleeve 54. The dowel 200 remains free to be moved longitudinally through the aperture 62 of the seal 50 without compromising the sealed engagement.

As set forth herein, in use, the housing 10 can become embedded into a curing first surface 400, with a portion of the dowel 200 protruding therefrom so as to become embedded into an adjacent, curing second surface 410. Thus, because the dowel 200 can move longitudinally through the seal 50, and because the seal 50 does not need to bridge between components of the housing 10 that are embedded into the two adjacent surfaces 400,410, the seal 50 is able to be constructed in a more robust and reliable format. For example, the seal 50 can be primarily constructed of high strength and durable materials, such as a metal, metal alloy, composite, etc., thereby allowing the dowel 200 to bear against and slide the sealing plate 52 of seal 50 laterally across the open end 14 as required, whilst still sealably engaging the dowel 200 when it slides longitudinally through the aperture 62.

Whilst the chamber 20 can be located at any position along the passage 40, in the embodiment shown in FIGS. 1 to 16, the chamber 20 is located at the anchor end 12 of the passage 40, so as to be at a housing end that is opposite to the seal 50. Thus, in use, the dowel 200 can extend fully through the passage 40 from the chamber 20 before protruding through the seal 50. A long overlap between the tendon and housing can assist in strengthening the joint. The longer overlap between the tendon and housing can also assist in reducing vertical pivoting of the tendon about the seal 50.

In the embodiments illustrated, at the point where the chamber 20 is connected to the passage 40, the chamber 20 has a greater internal cross-sectional height H2 and internal cross-sectional width W2 than the internal cross-sectional height H1 and internal cross-sectional width W1 of the passage 40. The chamber 20 is thus adapted to retain an anchor block 210 therein, whereby the relative cross-sectional dimensions of the passage 40 and the chamber 20, and the relative size of the anchor block 210, work together to prevent the anchor block 210 from moving wholly out of the chamber 20 and passing into and through the passage 40.

Figure 3:
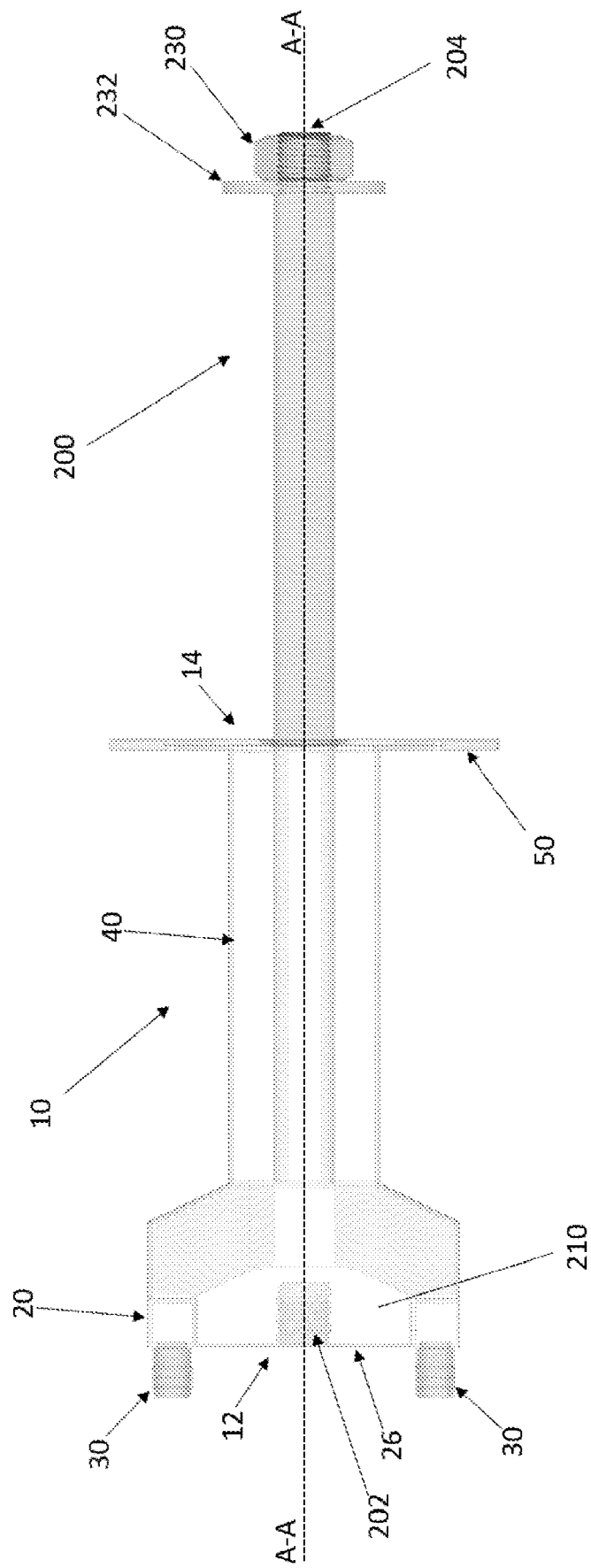
FIG. 3 is a partially transparent top view of the embodiment of the connector shown in FIG. 1, wherein an anchor block is depicted at its rearmost position in a chamber of the connector.
Figure 6A:
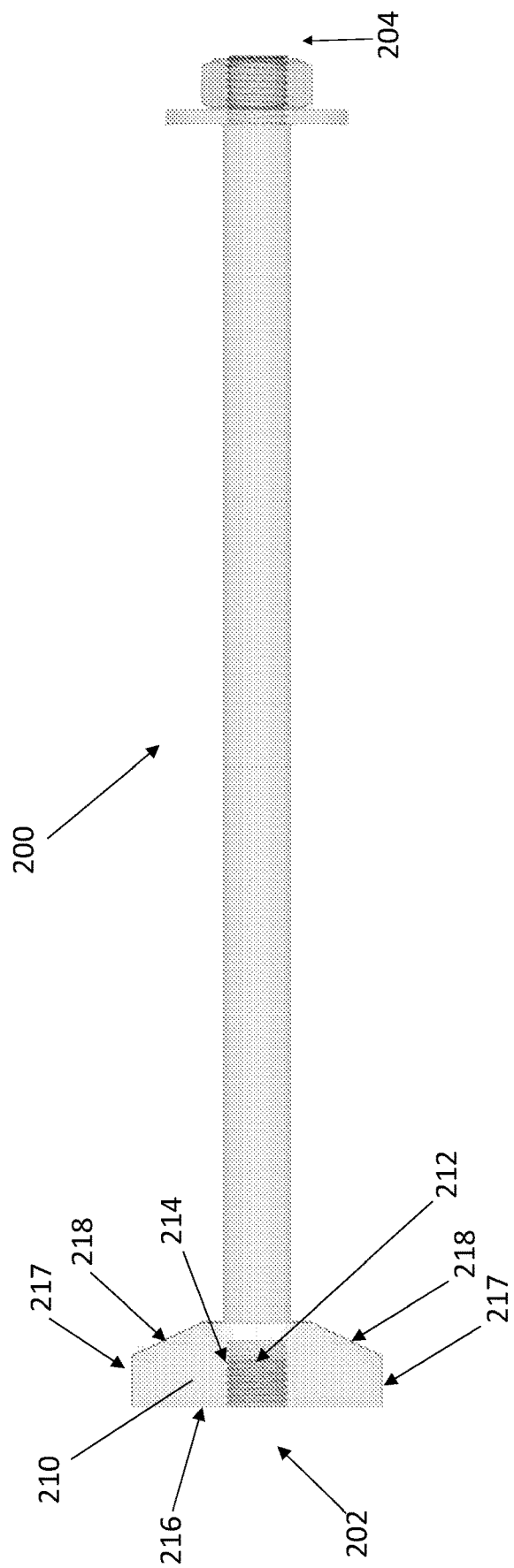
FIG. 6A is a partially transparent top view of a tendon in the form of a dowel of the connector shown in FIG. 1.
Figure 6B:
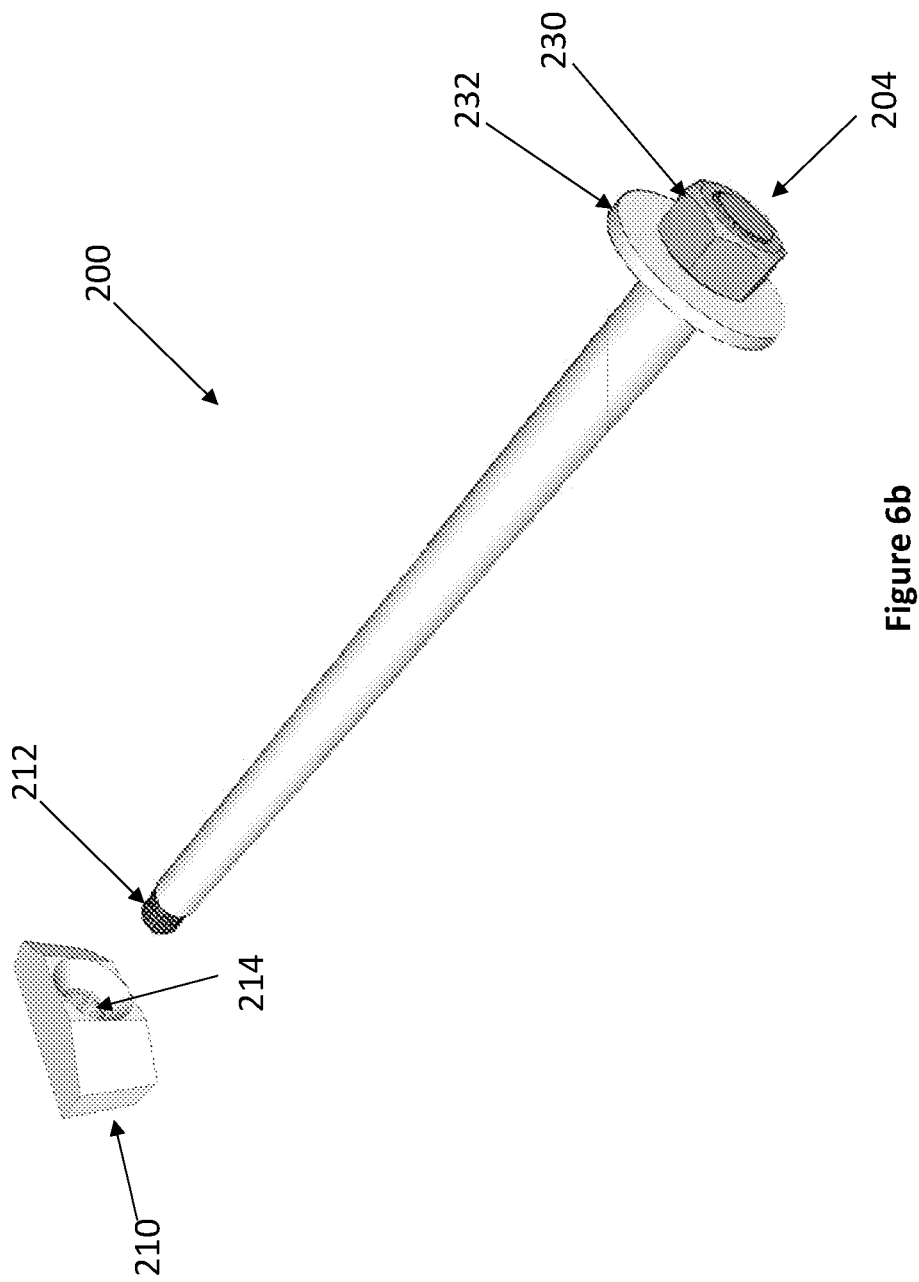
FIG. 6B is a perspective view of a tendon in the form of a dowel of the connector shown in FIGS. 1 and 6A, with an embodiment of the anchor block detached.

Typically, the anchor block 210 is an enlarged formation that is dimensioned to be moveable, in use, in a lateral and longitudinal direction relative to the central longitudinal axis A-A, within the chamber 20. When the tendon first portion 202 is inserted within the chamber, a first end of the dowel 200 can be connected to the anchor block 210. For example, as seen in FIGS. 3, 4 and 6, the tendon first portion 202 can be threaded 212 so as to be screwed into a corresponding threaded hole 214 formed in the anchor block 210. The tendon first portion 202 thus becomes configured such that it cannot be removed from the chamber 20, and thus from the housing 10 via the seal 50.

The internal walls of the chamber 20 and the corresponding contact surfaces of the anchor block 210 are sized and angled to oppose and so as to engage each other. The anchor block 210 can be a solid block that is substantially flat along the upper, lower, side and rear contact surfaces, with these surfaces opposing so as to engage corresponding substantially flat interior facing walls of the chamber 20. For example, the anchor block can have a rear facing contact surface 216 that is substantially flat and that extends substantially orthogonally with respect to the central longitudinal axis A-A (and to the longitudinal axis of the dowel 200). The rear facing contact surface 216 of the anchor block 210 can thus move or slide laterally along the substantially flat interior facing rear wall 26 of the chamber 20. Thus, the anchor block 210 is not impeded from moving transversely along the internal walls of the chamber 20. The anchor block 210 can have a vertical height that generally corresponds with the internal vertical height of the chamber 20. In use, a dowel 200 that has the anchor block 210 mounted to its threaded end 212 can thereby be substantially restrained from moving in a vertical direction relative to the housing 10.

Figure 9:
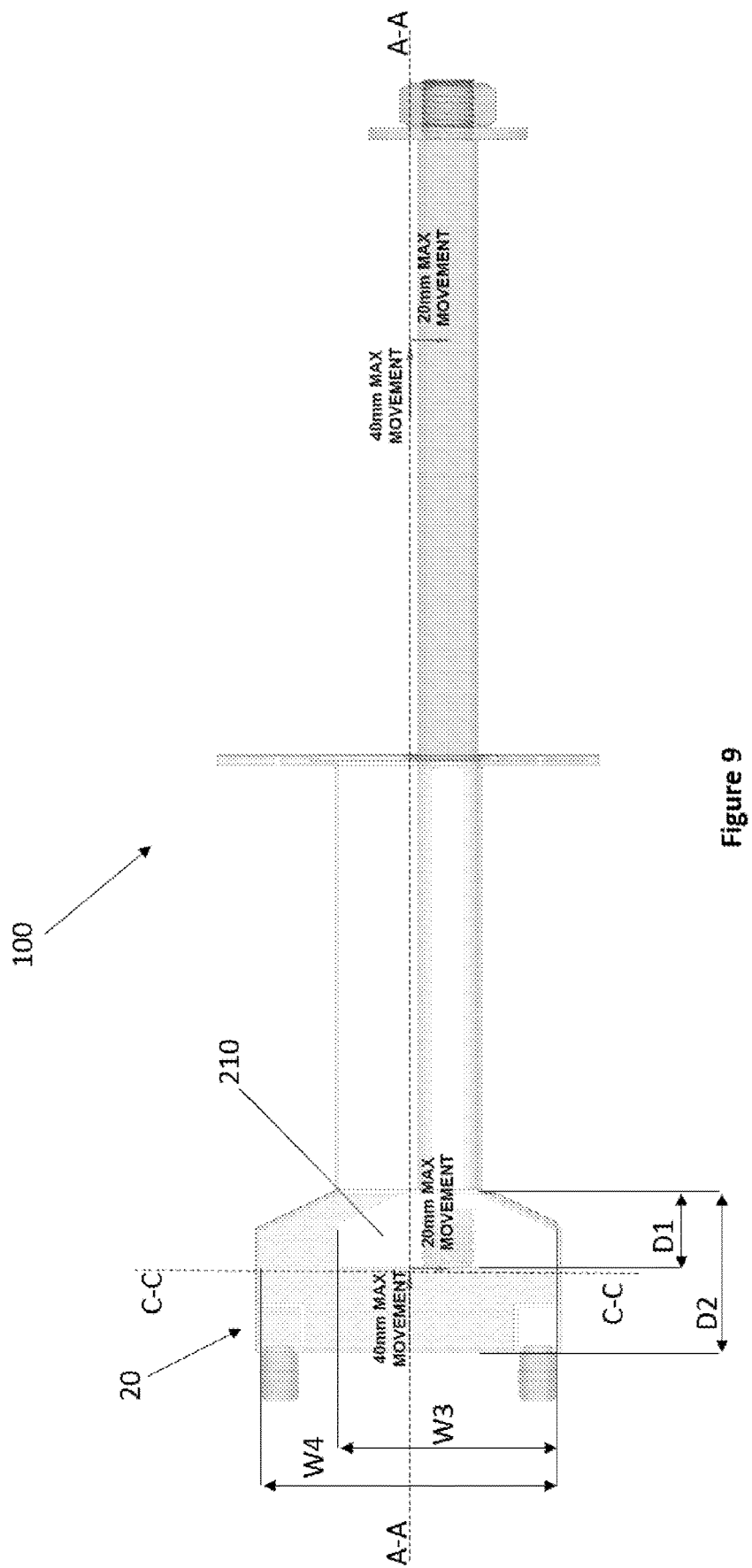
FIG. 9 is a partially transparent top view of the connector of FIG. 1, wherein the anchor block is shown at a maximum forward and lateral position within the chamber.
Figure 10:
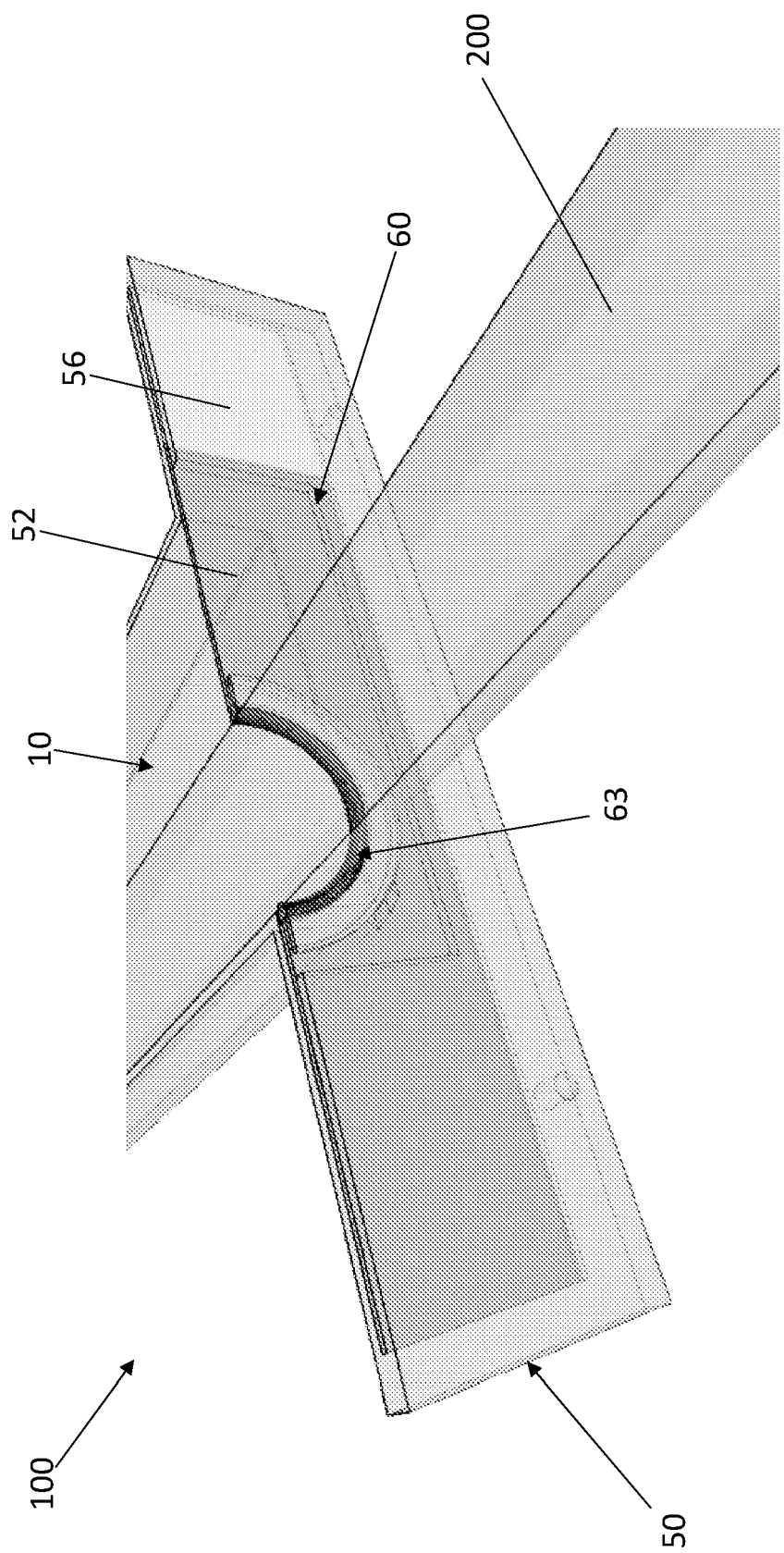
FIG. 10 is a partially transparent perspective sectional detail of an end of the housing, and portion of each of the seal and dowel, taken along the line B-B of FIG. 4, with the dowel and seal each in the position of FIG. 9.
Figure 11:
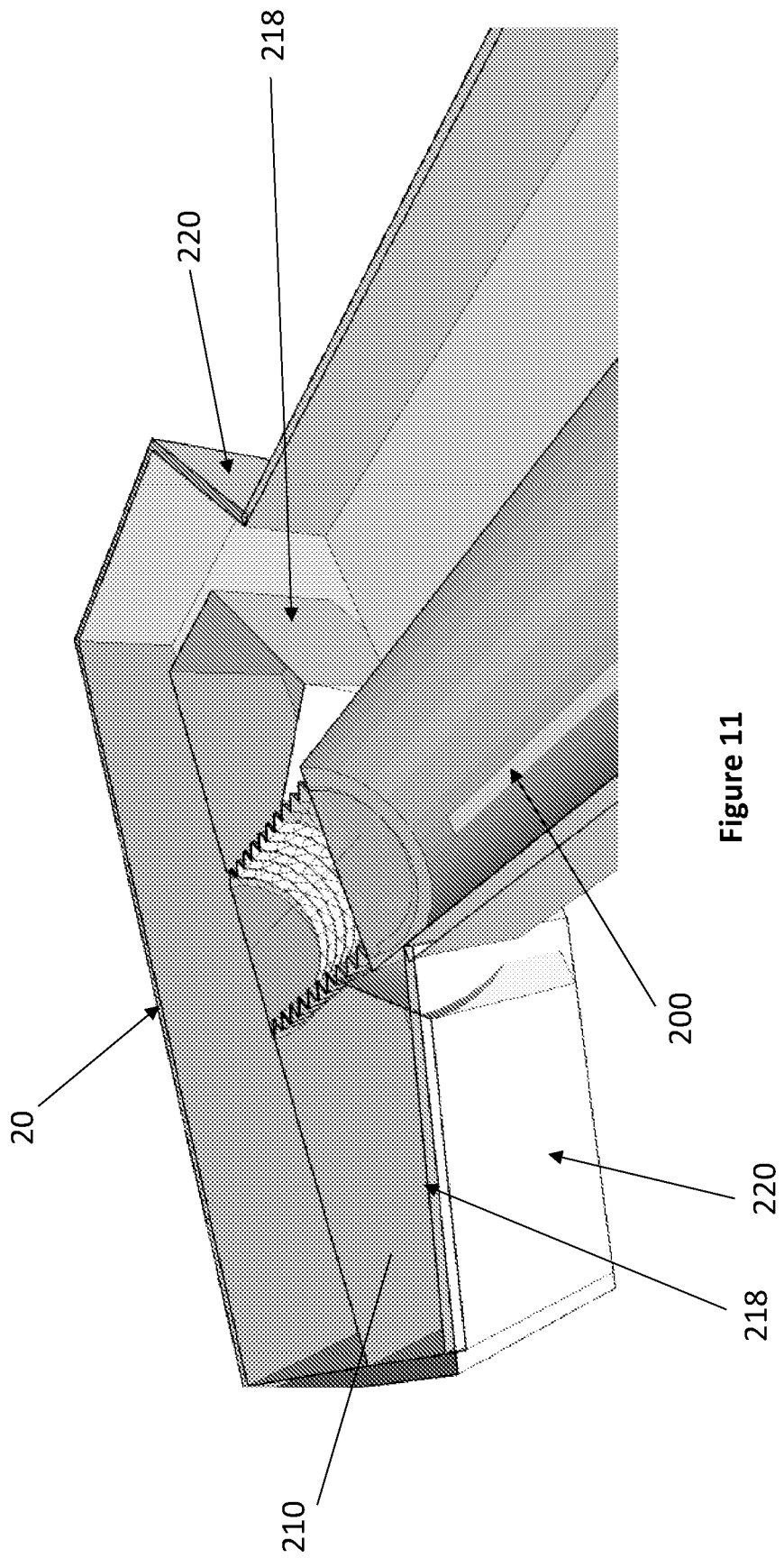
FIG. 11 is a perspective sectional detail of an opposite end of the housing, and portion of each of the dowel and anchor block, taken along the line B-B of FIG. 4, with the dowel and anchor block each in the position of FIG. 9.

The chamber 20 and anchor block 210 can be dimensioned to have relative lateral and longitudinal lengths between the opposing walls and contact surfaces, such that the range of lateral and longitudinal movement can be constrained to be within an allowable tolerance. For example, as illustrated by FIG. 9, the lateral width W3 of the anchor block 210 relative to the internal lateral width W4 of the chamber 20 can be adapted to correspond to the desired range of lateral movement of the dowel 200 with respect to the housing 10, prior to locking. For example, where the joint is to be allowed a lateral tolerance of 20 mm to either side of a central longitudinal axis A-A of the connector 100; the internal lateral width W4 of the chamber 20 can be 40 mm larger than the lateral width W3 of the anchor block 210. Likewise, as seen in FIG. 9, the longitudinal depth D1 of the anchor block 210 relative to the internal longitudinal depth D2 of the chamber 20 can be adapted to correspond with the desired range of longitudinal movement of the dowel 200 with respect to the housing 10 prior to locking. For example, where the joint is to be allowed a longitudinal tolerance of 20 mm relative to a central lateral axis C-C passing through the chamber; the internal longitudinal depth D2 of the chamber 20 can be 40 mm larger than the longitudinal depth D1 of the anchor block 210. A person skilled in the art would appreciate that the connector 100 is scalable and can be manufactured to any size to suit the specific constraints for the joint as specified by a structural engineer or similar person skilled in the art.

On either side of the threaded hole 214 and the longitudinal axis through the dowel 200, the anchor block 210 is symmetrical and can have angled contact surfaces 218 that form a plane that is angled with respect to the longitudinal axis of the dowel 200. The angling of the angled plane can be in the range of 30-90, optimally 30-60, degrees to the longitudinal axis of the dowel 200. The angled plane of the angled contact surfaces 218 may widen the resistance compression field area arising from a compression load applied by the anchor block 210 when it has been locked against movement due to grout having been introduced within to fill the chamber 20. When the first contact surface has an angled plane in this range, the resistance field of compression outside of the connector can be increased when compared to higher or lower angles. This can further improve the reliability and general performance of the connector 100. The corresponding angled walls 220 of the chamber 20 that are located adjacent the passage 40 can be angled in the range of 30-90 degrees to the central longitudinal axis A-A.

Figure 12:
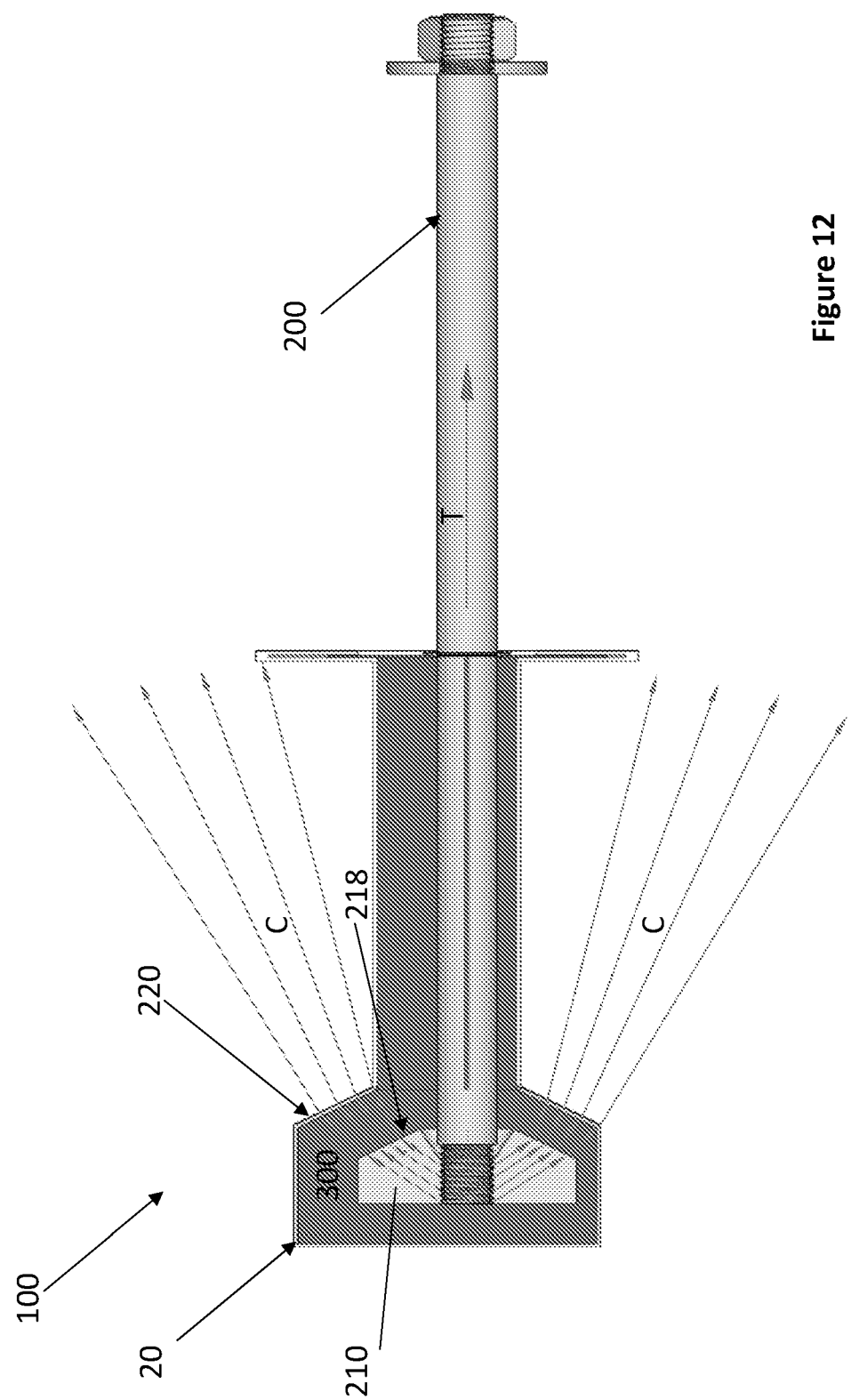
FIG. 12 is a schematic view of the connector taken along line B-B of FIG. 4, the view illustrating an example of force distribution vectors for the connector of FIG. 1.

As seen in FIG. 12, by way of example, a tension load T on the dowel 200 may thus be converted into a compression load that is dispersed between the anchor block 210, the surrounding grout (or cementitious material) 300, the angled chamber wall 220 and the surrounding surface (e.g. floor/wall slab) in which connector is embedded. For example, in embodiments when the anchor block 210 and chamber 20 are made from steel, the tensile load applied to the dowel 200 can be initially converted into a compression force via the angled contact surfaces 218 against the surrounding grout 300 which in turn is compressed against the inside of the angled chamber wall 220. The compression load C is then further distributed out of the chamber 20 by compression of the exterior surface of the angled chamber wall 220 against the surrounding surface (i.e. the surrounding concrete slab material). FIG. 12 illustrates how an angled plane of the angled contact surfaces 218 can thus act to widen the resistance field of a compression load C. By converting a majority of the tensile load into a compressive load the likelihood of failure of the connector may be reduced, as grout (and cementitious material in general) has increased performance when under compressive loads than when under tensile loads.

The chamber 20 can also have inlet and outlet connection points 30 arranged thereon to allow grout to flow into and out of the chamber 20. Grout that flows into the chamber 20 can flow therefrom into the passage 40 so as to fill the housing 10, and continues to flow until the grout overflows from the outlet. When the housing is substantially filled with grout, the grout surrounds and, when cured, captures the anchor block 210 as well as the shaft of the dowel 200 that is located inside the housing 10, such that a lateral and/or longitudinal movement of the dowel 200 relative to the housing 10 is now restricted/prevented. The connection points 30 are arranged at an upper portion of the chamber 20. Thus, once the housing 10 has been filled with grout, any excess grout flow outs of the housing 10 through the upper outlet connection point 30, thereby indicating that the housing is now substantially filled with grout.

A nut 230 and washer 232 can be fastened to the threaded end of the tendon second portion 204. Thus, the overall configuration of connector 100 is such that seal 50 does not need to bridge between the two adjacent surfaces 400,410, because the tendon second portion 204 is configured such that in use it can be captively secured within the second surface 410 on its own and independently of the seal (i.e. in contradistinction to prior art arrangements, the tendon second portion 204 is not fixed to any part of the housing that moves with the dowel 200 in both the lateral and longitudinal directions).

A method of installing the connector 100 to form a joint between a first surface 400 and a second surface 410, will now be described with reference to FIGS. 13 to 16. In the illustrated embodiment, the first 400 and second 410 surface are two adjacent floor slabs, however, a person skilled in the art would understand that the same method can be applied to any two adjacent slabs including, for example, a floor slab adjacent a vertical wall slab.

Prior to installation of the components of the connector 100, formwork 402,404 is erected to define the adjacent faces of the surfaces being joined (this formwork is schematically depicted in FIG. 13 and comprises horizontal plate 402 and vertical plate 404).

The housing 10 is then installed by fastening the sleeve 54 of seal 50 to the vertical formwork 404 through the fastening holes 66 (see FIG. 13A). At this stage of the method, the dowel 200 has not yet been inserted into the housing 10 and, as such, the opposing side of the vertical formwork 404 does not yet comprise any components of the connector 100 (see FIG. 13B). However, the chamber 20 of housing 10 has been "pre-loaded" with the yet-to-be-secured anchor block 210 positioned therein, ready to be later-connected to the dowel 200.

Furthermore, it will be seen that the seal 50 does not bridge across from the first surface 400 to the second surface 410. Thus, the seal 50 does not need to protrude through the vertical formwork 410 (i.e. it can simply be mounted to one side of plate 404). Further, the plate-facing side of the seal 50 need not be covered by an additional component to protect against the ingress of grout into the housing 10 (i.e. see FIG. 13B).

Figure 14B:
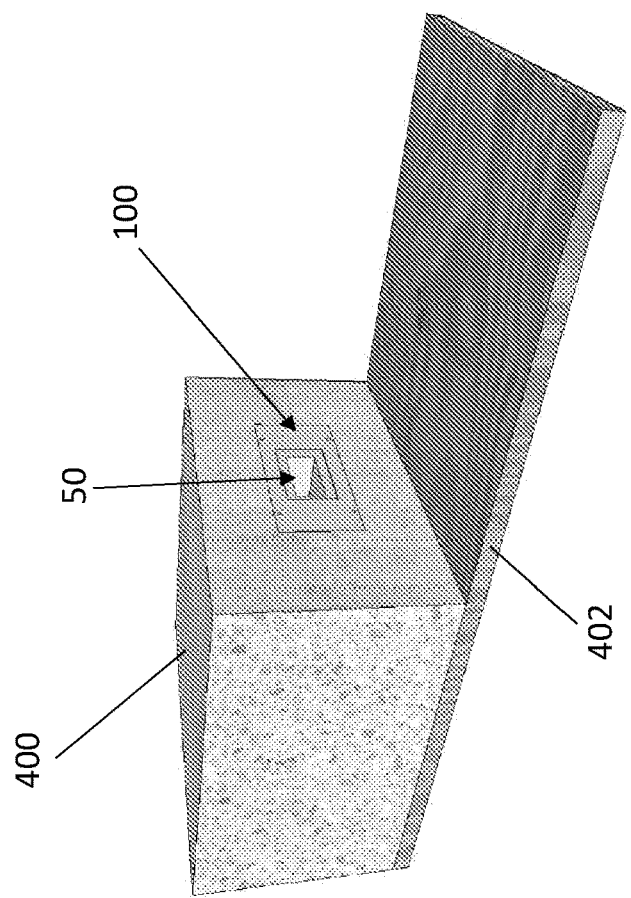
FIG. 14A and 14B are perspective views of the housing of the connector of FIG. 1 when embedded within a cured first surface, respectively prior to and after the removal of the vertical formwork shown in FIGS. 13A & B.
Figure 14A:
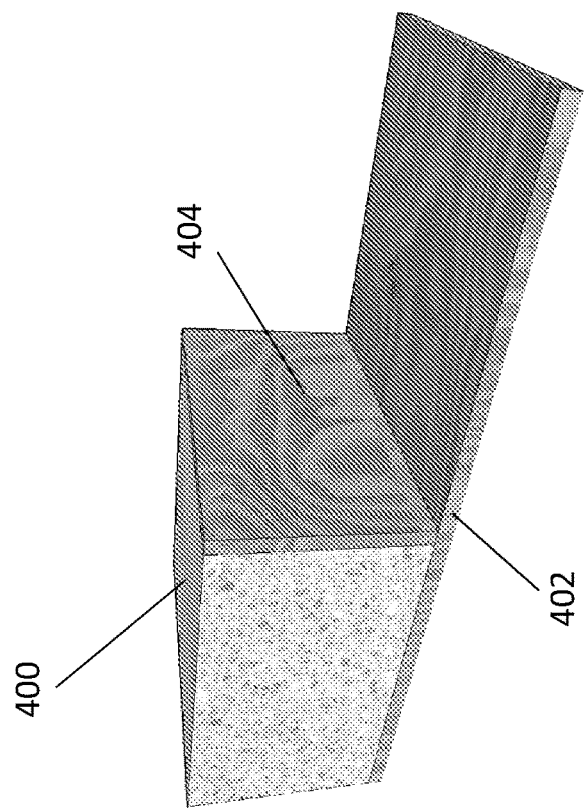

The first surface 400 is then poured along a first side of the removable vertical formwork plate 404 (see FIG. 14A). Although not depicted, conduits are connected to the inlet and outlet connection points 30 so that grout can later be pumped into the chamber 20 of housing 10. It would also be well understood by one skilled in the art that further formwork components that are typically used when forming a cementitious surface (e.g. steel mesh, saddles, ties, sides, etc.) are also installed prior to pouring the surfaces 400, 410.

Once the first surface 400 has cured sufficiently, the vertical formwork 404 is removed to expose the seal 50 (see FIG. 14B). It will also be seen that the outer facing surface of the seal 50 is substantially contiguous with the face of the first surface into which the housing 10 has become embedded.

Figure 15:
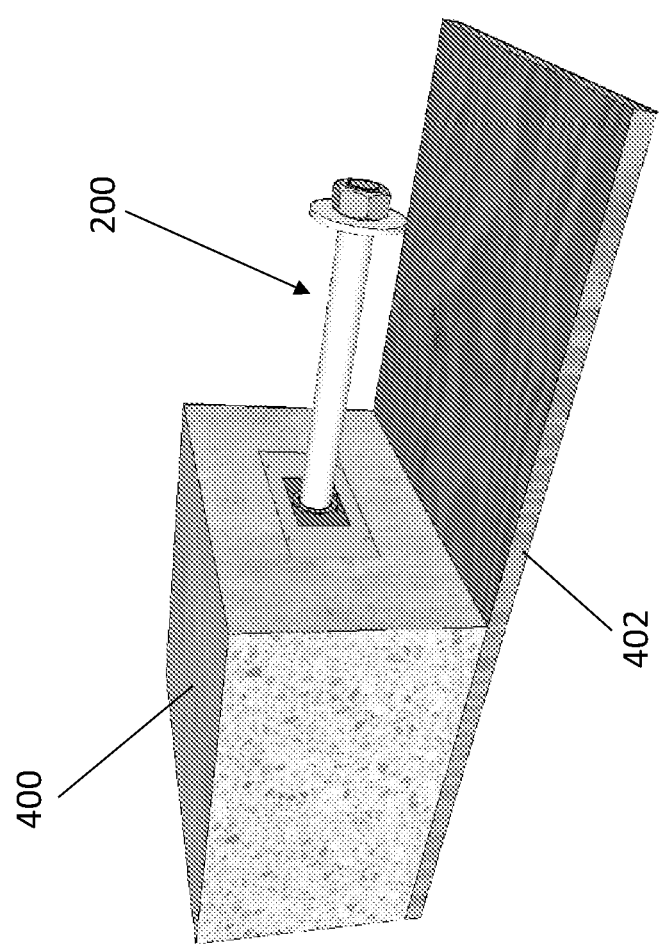
FIG. 15 is a perspective view similar to FIG. 14B, wherein the housing embedded within the cured first surface has a dowel installed therein so as to protrude from the embedded housing.

The dowel 200 can now be installed into the housing 10. Installation of the tendon includes inserting the first portion 202 of the dowel 200 through the aperture 62 of the sealing plate 54, leaving the tendon second portion 204 to protrude from the housing 10 (see FIG. 15). Once inserted into the housing 10, the tendon first portion can be connected to the anchor block 210. In this regard, the threaded end 212 of tendon first portion 202 can be screwed into the corresponding threaded hole 214 of the anchor block 210. Thus, the anchor block 210 now captively retains the tendon first portion 202 within the housing (FIG. 15).

Figure 16B:
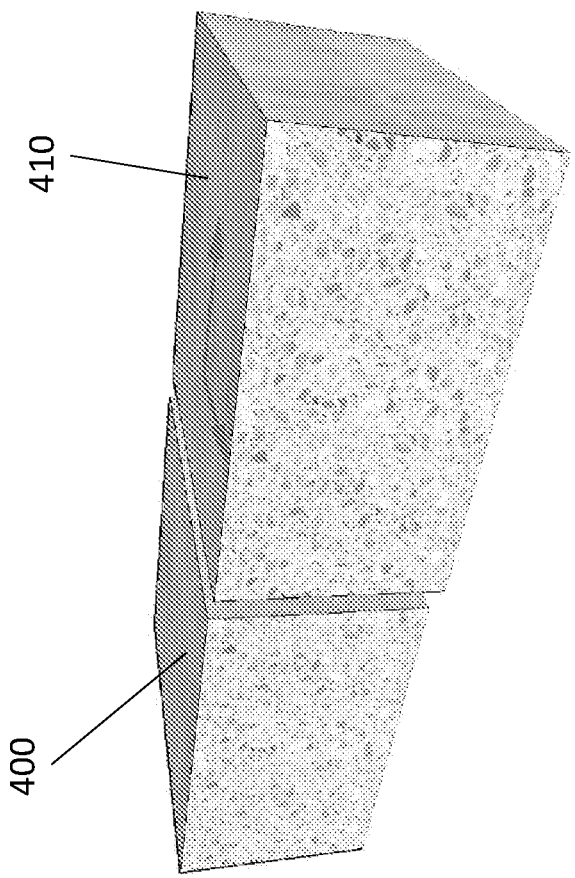
FIG. 16B is a perspective view similar to FIG. 16A but wherein the second surface is depicted as being able to move laterally and longitudinally relative to the first surface.
Figure 16A:
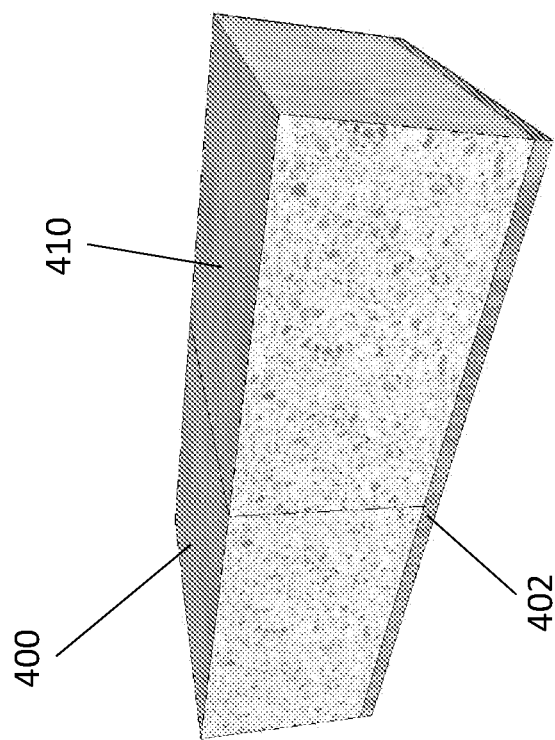
FIG. 16A is a perspective view similar to FIG. 15 but where a second surface has been poured and cured around the dowel to locate adjacent to the first surface.

The second surface 410 is then able to be poured around the tendon second portion 204 (see FIG. 16A). Initially, the second surface 410 is located adjacent to the first surface 400 (FIG. 16A). However, once the surfaces are sufficiently cured, and with the formwork removed (FIG. 16B), the two surfaces are then allowed to move laterally and/or longitudinally relative to one another (i.e. as the surfaces progressively cure, settle and harden). During the usual, resultant differential movement that occurs between the surfaces 400, 410, the housing 10 remains captive within and is thus moved by and with the first surface 400, whilst the tendon second portion 204 remains captive within and is thus moved by and with the second surface. The connector 100 is designed to accommodate all such movement, without breaking the joint between surfaces 400, 410 and thus supporting them throughout curing.

When the surfaces 400, 410 have sufficiently cured such that minimal or no further differential movement between them occurs, the connector 100 is locked by pumping grout into the housing 10 through the inlet connection point 30 located above the chamber 20, with excess grout then flowing out of the outlet connection point 30. The excess grout can also be used to fill up any voids left by the grout connecting conduits or passages formed within the surface 400. Once the grout has cured, the connector 100 is locked whereby the dowel 200 and housing 10 and thus the surfaces 400, 410 are prevented from any further movement relative to one another.

In a variation of the above described installation method, the dowel 200 can be cured into the second surface 410 prior to being inserted into the housing 10 (and prior to the housing 10 being embedded into the first surface 400). In another variation of the above described installation method, the housing 10 and dowel 200 can be pre-assembled through the vertical formwork plate 404 and the surfaces 400, 410 can then be poured simultaneously.

In a further variation, illustrated in FIGS. 17 to 20, and in which like reference numbers are used to denote similar or like parts to those previously described, a connector 100' is shown in which the housing 10' can be formed as multiple components and/or using a plurality of materials.

For example, the in-use rearward portion 10a' of the housing 10', comprising the chamber 20' and a rearward portion of the passage 40a, can be formed as a separate component from the in-use forward portion 10b' of the housing 10', comprising a forward portion of the passage 40b and the seal 50'. The in-use rearward portion 10a' can further be formed to comprise a lower shell 21' and an upper shell 22', where each shell 21', 22' can be formed by injection moulding using a thermoplastic polymer such as ABS. The two shells 21', 22' can be friction welded together along respective lips 23' so as to form together the in-use rearward portion 10a' of the housing 10'. The lips 23' are formed during the injection moulding process along the edge where the two shells 21', 22' abut in use.

By contrast, the in-use forward portion 10b' can be formed using steel components, for example using stainless steel or mild steel. The open end 42b of the passage 40b of the in-use forward portion 10b' can be slidably received within the open end of the passage 40a of the rearward portion 10a'. Once slidably received, the passage 40a of the rearward portion 10a' can be dimensioned relative to the passage 40b so as to disallow any concrete cement fines from ingressing therebetween during casting of the surface 400. In some embodiments, open end 42b can be press-fit within the rearward portion 10a' so as to be retained thereat. In some embodiments, the passage 40a of the rearward portion 10a' can overlap with the passage 40b sufficiently so as to disallow any concrete cement fines from ingressing therebetween during casting of the surface 400. An inwardly projecting flange 43' is adapted around the interior facing walls of the passage 40a of the rearward portion 10a'. The flange 43' is configured so as to abut the foremost edge of the open end 42b of the passage 40b of the in-use forward portion 10b', whereby the in-use forward portion 10 b' is prevented from sliding any further within the passage 40a of the rearward portion 10a'.

Figure 19B:
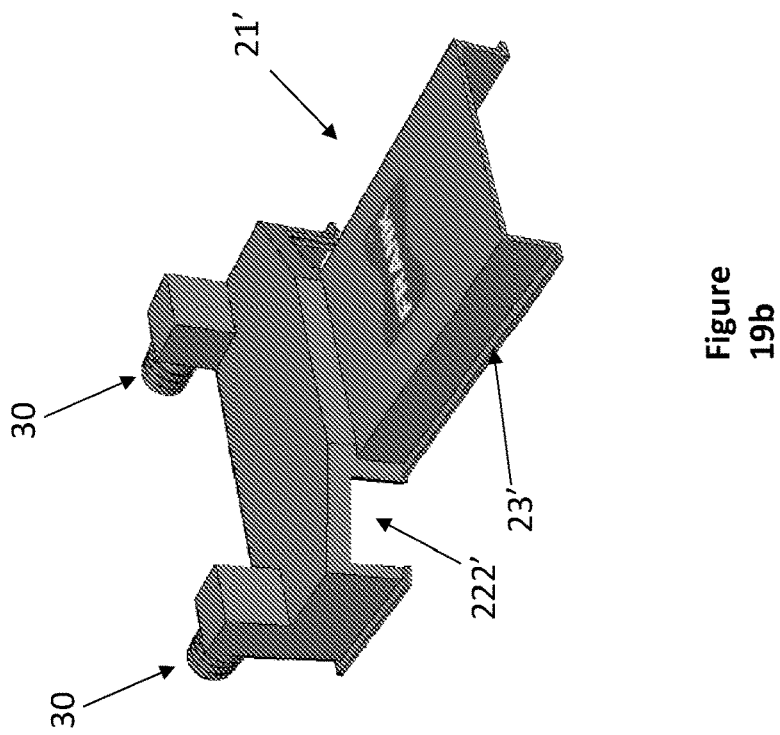
FIG. 19B is a perspective view of the removed upper portion of the housing of the further embodiment of FIGS. 17-19A.
Figure 19A:
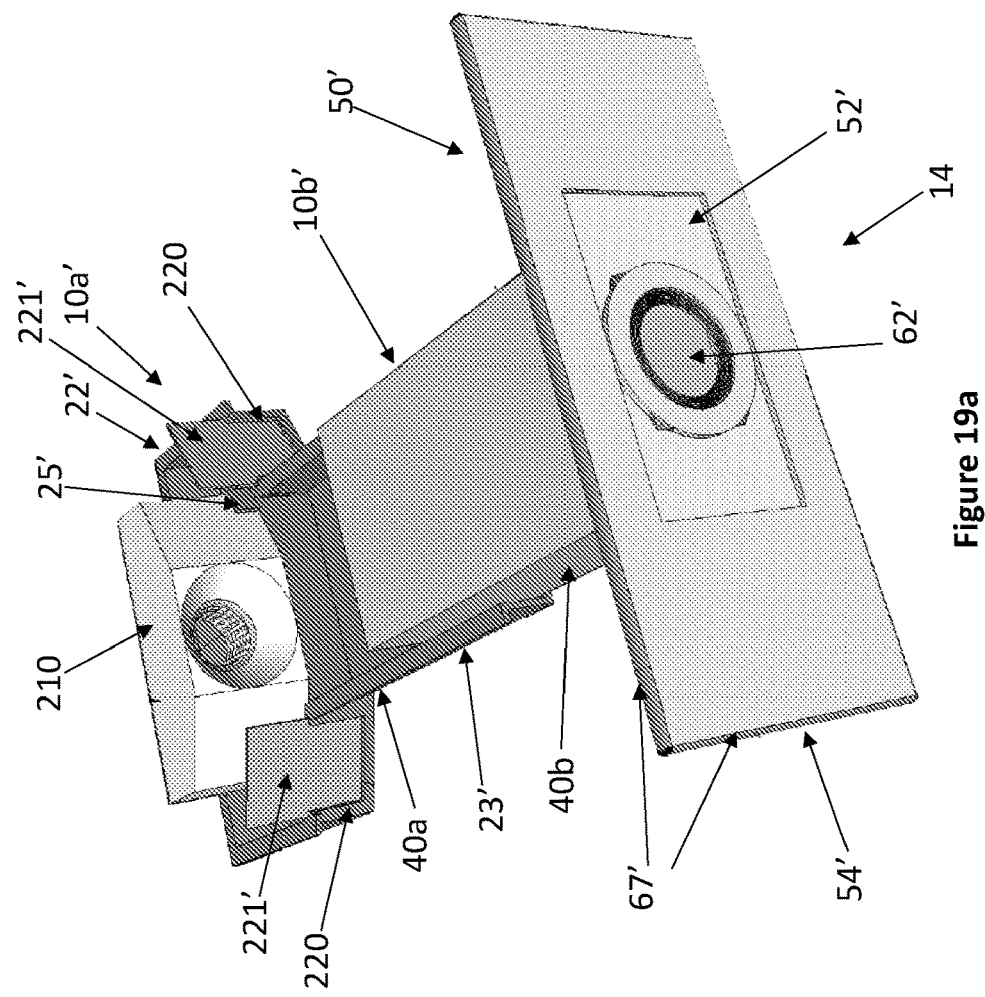
FIG. 19A is a perspective view of the housing of the further embodiment of FIGS. 17 & 18, with an upper portion of the housing removed.
Figure 19D:
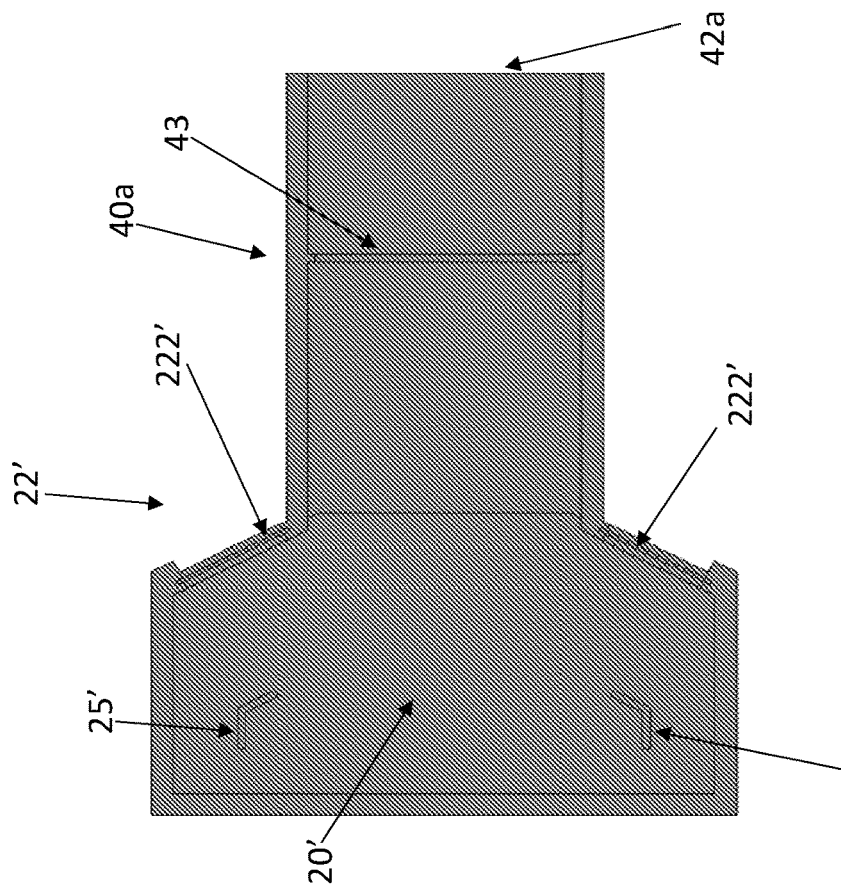
FIG. 19D is a top view of the lower portion of the housing of FIG. 19C.
Figure 19C:
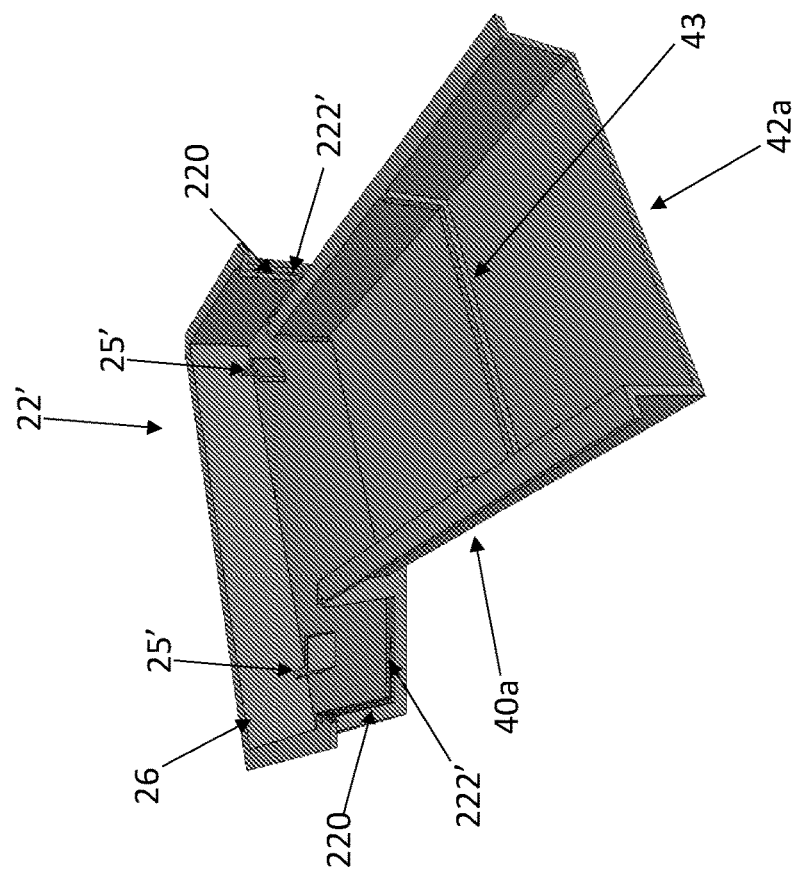
FIG. 19C is a perspective view of a lower portion of the housing of the further embodiment of FIGS. 17-19A.

At least one of the lower shell 21' and/or upper shell 22' of the chamber 20' can comprise anchor block tabs 25' (see FIGS. 19A, 19C, 19D). The anchor block tabs 25' project inwardly from the respective lower or upper shell 21'22' surface so as to interact with a portion of the contact surfaces 218 and/or side surfaces 217 of the anchor block 210. Prior to displacement of the anchor block 210 during curing, the anchor block tabs 25' support the anchor block 210 in a substantially central location within the chamber 20'. In some embodiments, as shown in FIG. 19A-D, the anchor block tabs 25' can support the anchor block 210 substantially centrally laterally, and rearward against the interior facing rear wall 26 of the chamber 20'. In some embodiments, not shown, the anchor block tabs 25' can support the anchor block 210 substantially centrally laterally, and substantially centrally longitudinally within the chamber 20' so as to provide space in all directions within which the anchor block 210 can move. This can assist with aligning the respective threaded portions 212, 214 of the dowel 200 and the anchor block 210 when the dowel is inserted into the housing 10' via the seal 50. In use, when the dowel 200 moves laterally and or longitudinally relative to the housing 10', the force applied by the anchor block 210 at the tendon first portion 202 against the anchor block tabs 25' can cause the anchor block tabs 25' to fail, for example, to break off, whereby the anchor block 210 is released from the restraining effects of the anchor block tabs 25'.

Figure 17:
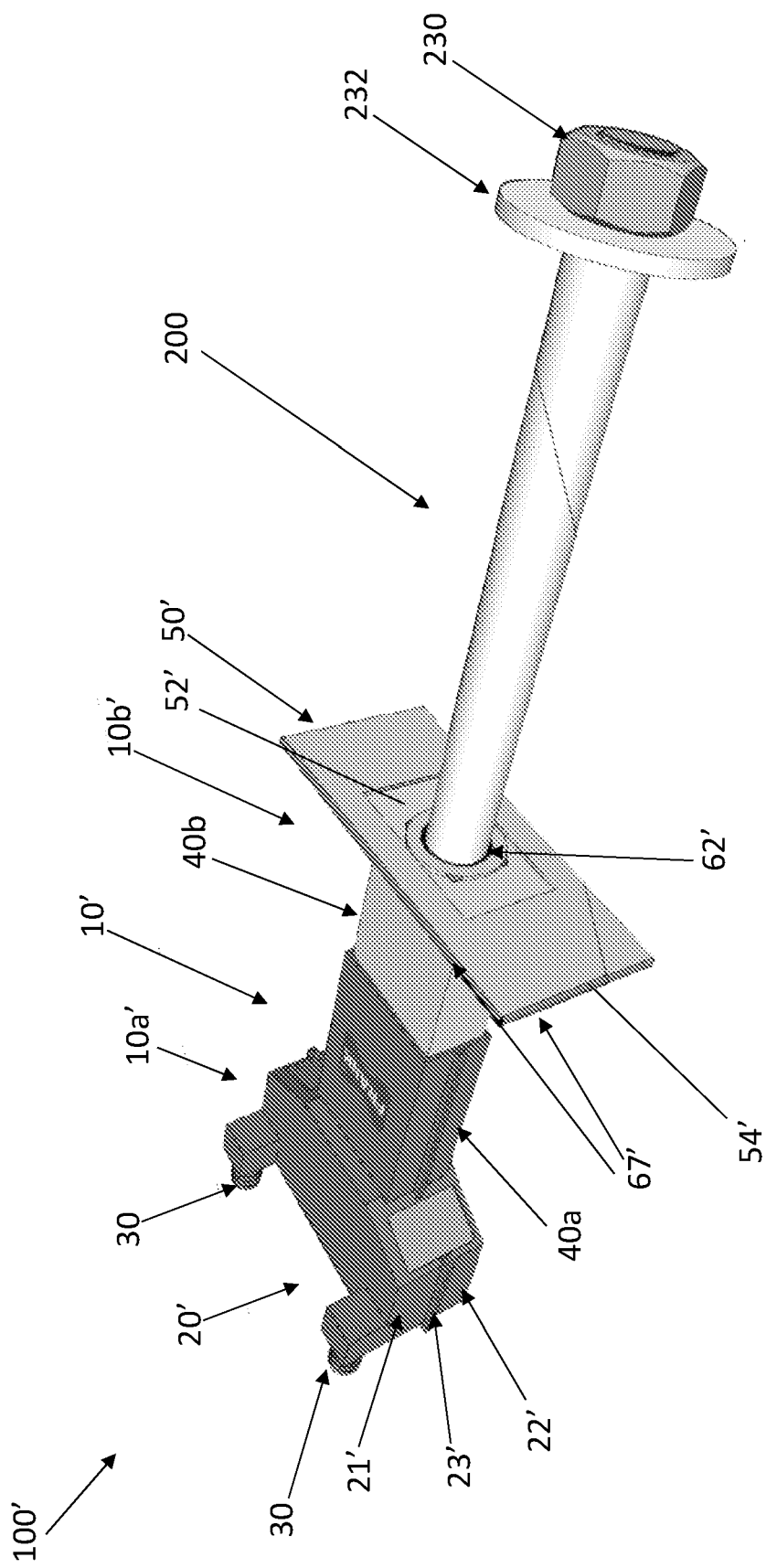
FIG. 17 is a perspective view of a further embodiment of a connector.
Figure 18:
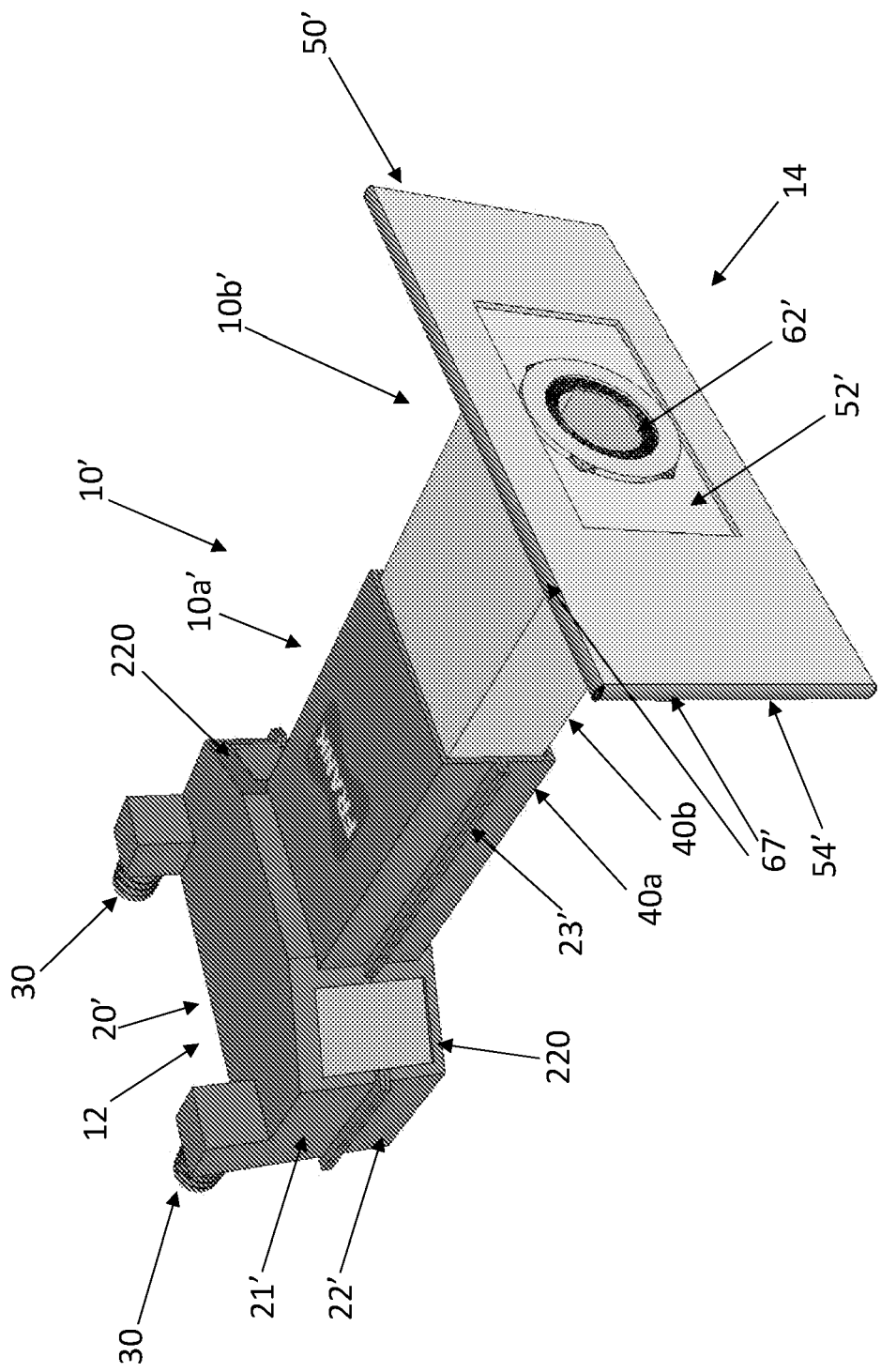
FIG. 18 is a perspective view of a housing of the further embodiment of FIG. 17.
Figure 20:
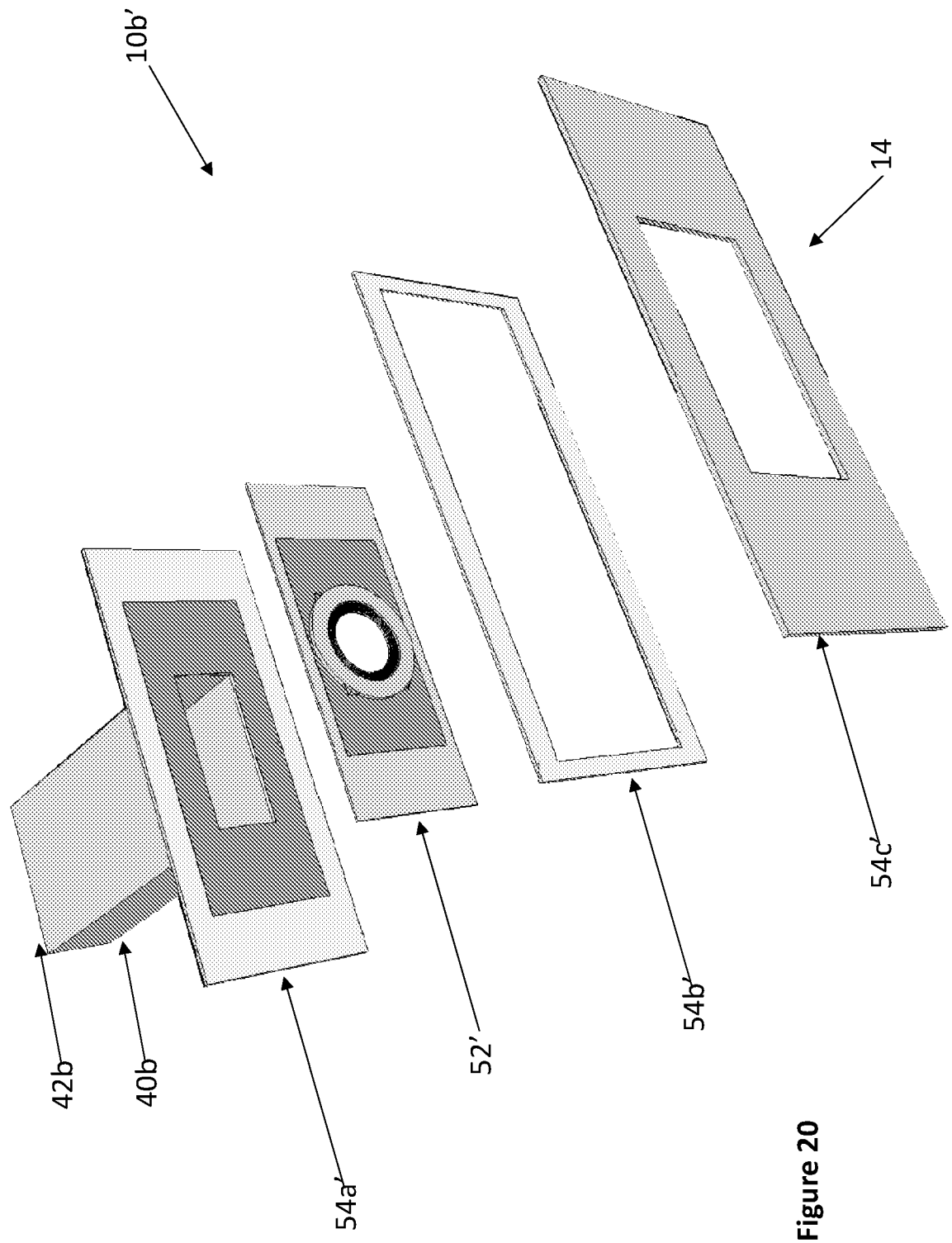
FIG. 20 is an exploded perspective view of the seal of the further embodiment of FIG. 17.

As best seen in FIG. 20, the seal 50' comprises a sealing element in the form of a sealing plate 52' that is captively retained within a sleeve 54', the sleeve 54' being mounted at the open end 14 of the in-use forward portion 10b'. The sleeve 54' comprises a backing plate 54a', a spacer plate 54b' and a front plate 54c'. The forward portion of the passage 40b and the backing plate 54a' can be welded together on the rear side of the backing plate 54a'. The spacer plate 54b' and the front plate 54c' can be welded onto the forward side of the backing plate 54a', whereby a contained pocket (not shown) is formed therebetween. The sealing plate 52' can be formed to have a height that generally corresponds to the height of the pocket 56' such that the sealing element 52' cannot slide up or down vertically within the pocket 56' but is still able to slide laterally within and along the width of the pocket 56'. As best seen in FIGS. 17, 18 and 19A, the seal 50' can be welded on all sides 67' of the sleeve 54'. This can improve the manufacturability of the seal 50'.

Figure 21:
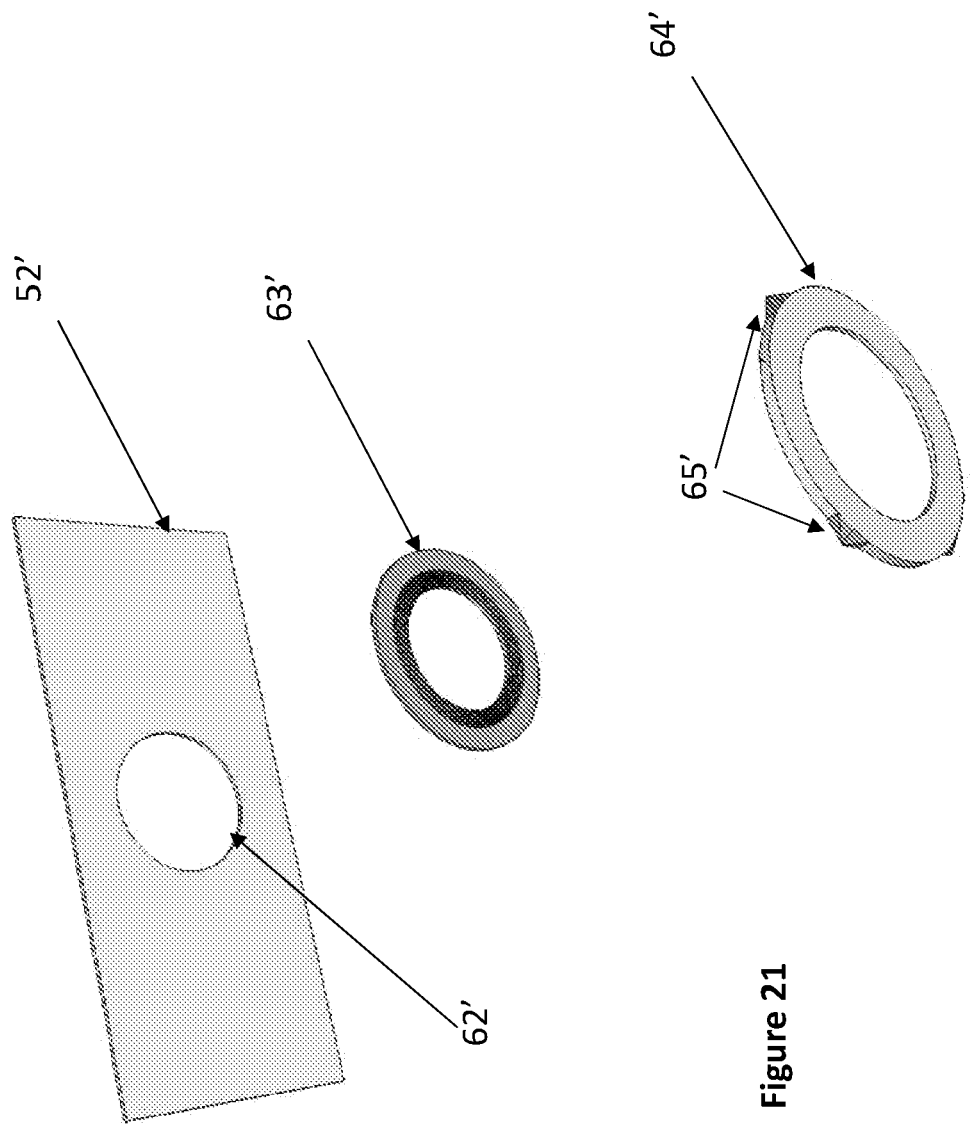
FIG. 21 is an exploded perspective view of an embodiment of the sealing plate of the seal of FIG. 20.

The aperture 62' of the sealing plate 52' can comprise an O-ring 63' around its perimeter that can assist with creating a close seal between the sealing plate 52' and the dowel 200 (see FIG. 21). The O-ring 63' can be retained adjacent the aperture 62' by a weld plate 64'. The weld plate 64' comprises a plurality of tabs 65' that facilitate welding of the weld plate 64' to the sealing plate 52' and can reduce the likelihood of the O-ring 63' being damaged during the manufacturing process. In some embodiments, the O-ring 63' can be formed from a compressed or toughened elastomeric material such as a hard rubber. The O-ring 63' can be tolerated to seal against the dowel 200 such that grout cannot pass therebetween, yet without restricting the dowel 200 from being able to move longitudinally therethrough.

As discussed above, a tension load T on the dowel 200 may be converted into a compression load that is dispersed between the anchor block 210, the surrounding grout (or cementitious material) 300, the angled chamber wall 220 and the surrounding surface (e.g. floor/wall slab) in which connector 100' is embedded. For example, in embodiments such as in FIGS. 17 to 19, where the chamber 20' is made primarily using an injection moulded thermoplastic polymer, each of the angled chamber walls 220 can comprise a steel plate 221'. As best seen in FIG. 19A, each steel plate 221' can be retained within a window-frame-like groove 222' formed in each of the angled chamber walls 220 on either side of the chamber 20'. Thus, tensile loads applied to the dowel 200 can be converted into a compression force via the angled contact surfaces 218 of the anchor block 210 against the surrounding grout 300 which in turn is compressed against the inside of the steel plate 221' configured at the angled chamber wall 220. The compression load C can then be further distributed out of the chamber 20' by compression of the exterior surface of the steel plate 221' against the surrounding surface (i.e. the surrounding concrete slab material). By forming the chamber 20' primarily using injection moulded thermoplastic polymer, the housing 10' can advantageously be fabricated more cheaply, and with a more complex shape, whilst retaining the design and functionality requirements that are necessary for transferring the forces that act on the dowel 200 and anchor block 210 via the surrounding grout 300 to the steel plates 221' and outwards into the surrounding surface 400.

Figure 23A:
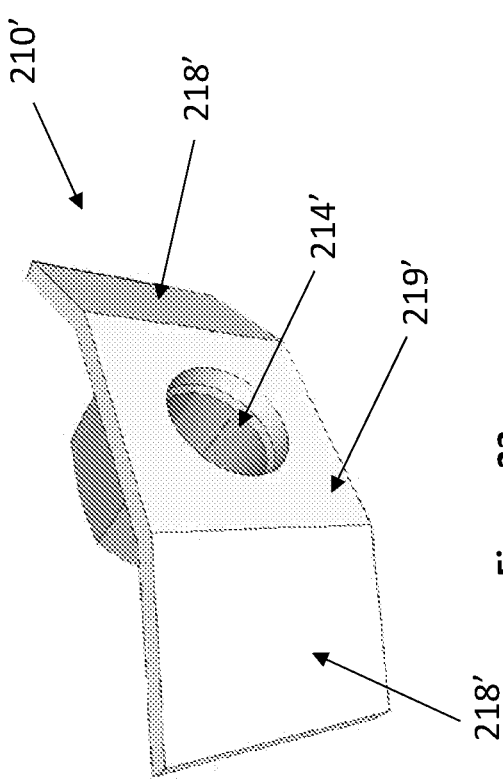
FIGS. 23A, 23B and 23C are forward perspective, rearward perspective, and side views respectively of a further of embodiment of the anchor block.
Figure 23B:
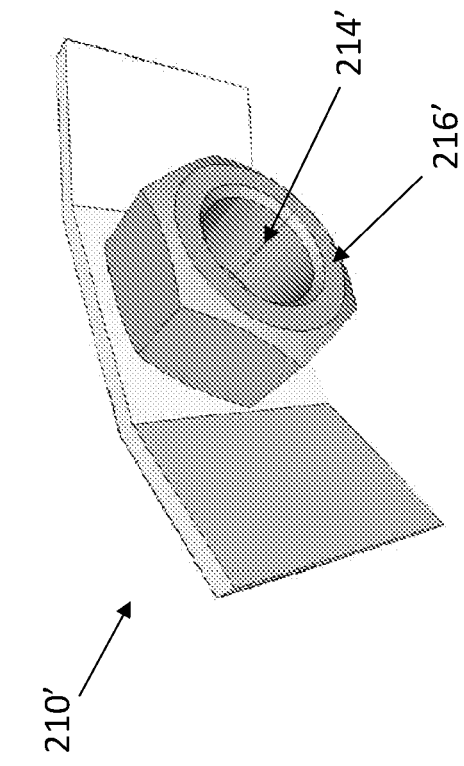
Figure 23C:
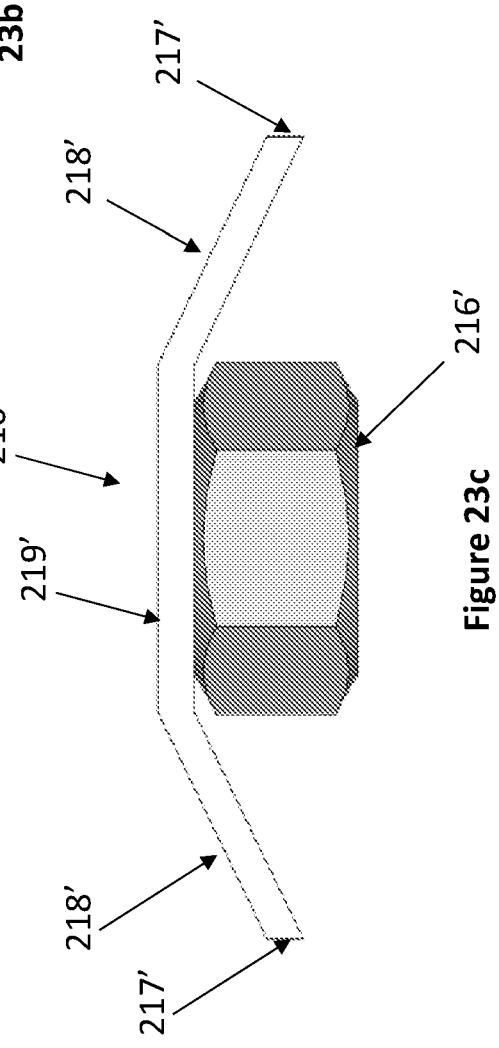

In a further variation, illustrated in FIGS. 23A to 23C, the anchor block 210' can be formed as a plate having symmetrical angled contact surfaces 218' that are bent relative to the forward contact surface 219' on either side of a threaded hole 214' so as to form planes that are angled with respect to the longitudinal axis of the dowel 200. The weight of the anchor block 210' can thus be reduced. As above, the angling of the angled plane can be in the range of 30-90, optimally 30-60, degrees to the longitudinal axis of the dowel 200. The internal walls of the chamber 20 and the corresponding contact surfaces of the anchor block 210' are sized and angled to oppose and so as to engage each other. Furthermore, the anchor block 210' is dimensioned to be moveable, in use, in a lateral and longitudinal direction relative to the central longitudinal axis A-A, within the chamber 20.

In use, the rear surface of the threaded hole 214' forms the rear facing contact surface 216' that is substantially flat and that extends substantially orthogonally with respect to the central longitudinal axis A-A (and to the longitudinal axis of the dowel 200). Thus, when the tendon first portion 202 is inserted within the chamber 20, a first end of the dowel 200 can be connected to the anchor block 210' through the threaded hole 214' that extends from the forward contact surface 219' towards the rear facing contact surface 216'. In use, the relative dimensions of the anchor block 210' and the cross-sectional dimensions of the passage 40 and the chamber 20 work together to limit the movement of the anchor block 210' within the chamber 20.

It would also be well understood by one skilled in the art that the anchor block may take any of a plurality of shapes or forms, and yet still be able to function within the scope of the present disclosure as described above.

In yet a further variation, the aperture 62" of the sealing plate 52" can be formed as a threaded window that is configured to receive a cylindrical sealing ring 68" (see FIGS. 22A-B). The sealing ring 68" can be screwed into the threaded aperture 62". In some embodiments, the interior surface of the cylindrical sealing ring 68" can comprise an O-ring like seal 63" that can be tolerated to seal against the dowel 200 such that grout cannot pass therebetween, yet without restricting the dowel 200 from being able to move longitudinally therethrough.

In use, the rearward projection 69" of the threaded aperture 62" and sealing ring 68" are adapted to fit within the open end of the passage. In some embodiments, not shown, the rearward projection 69" can act as a stop. Thus, as the sealing plate 52" slides laterally within the seal in use, the rearward projection 69" can abut the interior side walls of the passage so as to prevent the sealing plate 52" from any further lateral movement in that direction.

In some embodiments, the sealing function (e.g. that can be performed by the O-ring 63, 63', 63") can be instead performed by use of grease, bentonite or any suitable material that swells upon contact with water or grout. In some embodiments, a contact surface comprising a compressed rubber exterior can allow sufficient sliding whilst simultaneously performing the sealing function. In some embodiments, compressed rubber can be suitable for facilitating sufficient sliding in the between the sealing plate 52 and the internal faces of pocket 56 of sleeve 54.

Other variations and modifications may be made to the parts previously described without departing from the spirit or ambit of the disclosure.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the connector, system and method.

The invention claimed is:

1. A connector suitable for use in forming a joint between a first surface in the form of a cast section, slab or plate and a second surface in the form of a cast section, slab or plate, the connector comprising a housing and a tendon;
a portion of the tendon protruding from the housing through a seal, the seal being configured to sealably cover an open end of the housing, the seal being further configured such that, in use when forming a joint between the first and second surfaces, the tendon can move through the seal and laterally sideways across the open end together with at least a portion of the seal,
wherein the seal comprises a sleeve and a sealing element that is configured to be retained within the sleeve so that the sleeve peripherally surrounds the sealing element, the sleeve being affixed at the open end of the housing, such that the lateral movement of the tendon causes the sealing element to be laterally displaced within and relative to the sleeve. and
wherein the sealing element comprises a flat plate that is configured to move laterally with the tendon in use.

2. A connector as claimed in claim 1, wherein the seal is arranged to contain a semisolid or pseudo-plastic fluid between the sealing element and the sleeve such that a grout and/or cementitious material is prevented from flowing through the seal between the sleeve and the sealing element.

3. A connector as claimed in claim 1, wherein the sealing element comprises an aperture therethrough that is closely dimensioned so as to sealably engage the tendon, whilst permitting the tendon to slide back-and-forth therethrough in use.

4. A connector as claimed in claim 3, wherein the aperture comprises an O-ring around its perimeter, the O-ring being adapted to sealably engage the tendon.

5. A connector as claimed in claim 4, wherein the flat plate is formed from a stiff/rigid material, whereas the O-ring is formed from a flexible/resilient material.

6. A connector as claimed in claim 4, wherein the flat plate is formed from metal.

7. A connector as claimed in claim 4, wherein the O-ring is formed from an elastomeric material.

8. A connector as claims in claim 1, wherein the housing has an inlet configured such that a grout can flow therethrough into the housing, and an outlet configured such that a grout can flow therethrough out of the housing.

9. A connector as claimed in claim 8, wherein at least one of the inlet and/or the outlet are arranged at an upper portion of the housing.

10. A connector suitable for use in forming a joint between a first surface in the form of a cast section, slab or plate and a second surface in the form of a cast section, slab or plate, the connector comprising a housing and a tendon,
a first portion of the tendon being retained within the housing, and
a second portion of the tendon protruding from the housing through a seal,
wherein the tendon first portion has a configuration that is able to move longitudinally and laterally within the housing along with movement of the tendon, the configuration being such that the tendon first portion cannot pass out of the housing via the seal,
wherein the seal comprises a sleeve and a sealing element that is configured to be retained within the sleeve so that the sleeve peripherally surrounds the sealing element, the sleeve being affixed at the open end of the housing, such that the lateral movement of the tendon causes the sealing element to be laterally displaced within and relative to the sleeve, and
wherein the sealing element comprises a flat plate that is configured to move laterally with the tendon in use.

11. A connector as claimed in claim 10, wherein the configuration of the tendon first portion comprises an enlarged formation at the tendon, the enlarged formation preventing said tendon first portion from passing out of the housing via the seal.

12. A connector as claimed in claim 11, wherein the enlarged formation is at the end of the tendon first portion.

13. A connector as claimed in claim 11, wherein the configuration of the tendon first portion comprises an enlarged formation at the tendon, the enlarged formation preventing said tendon first portion from passing out of the housing via the seal, wherein the enlarged formation is adapted such that a tensile force applied the tendon can be transferred via the enlarged formation to the housing as a compression force.

14. A connector as claimed claim 10, wherein the housing comprises a passage that extends from the seal, the housing further comprising a chamber located along the passage, and wherein said configuration of the tendon first portion is retained within the chamber.

15. A connector as claimed in claim 14, wherein the seal is located at one end of the passage and the chamber is located at an opposite end of the passage, such that the tendon extends through the passage between the chamber and seal.

16. A connector as claimed in claim 14, wherein the configuration of the tendon first portion comprises an enlarged formation at the tendon, the enlarged formation preventing said tendon first portion from passing out of the housing via the seal, wherein the enlarged formation is an anchor block dimensioned such that it is prevented from moving through the passage, but is able to move longitudinally and laterally within the chamber along with the movement of the tendon.

17. A connector as claimed in claim 16, wherein the anchor block comprises a first contact face that forms a plane that is angled with respect to a longitudinal axis of the tendon, the first contact face being adapted to oppose so as to engage a corresponding interior facing wall of the chamber that is located adjacent to an opening between the passage and chamber.

18. A connector as claimed in claim 17, wherein the anchor block is symmetrical across the tendon longitudinal axis, whereby the first contact face comprises respective angled planes located on opposite sides of the tendon longitudinal axis.

19. A connector as claimed in claim 17, wherein the angling of the angled plane is in the range of 30-90 degrees to the tendon longitudinal axis.

20. A connector as claimed in claim 17, wherein the anchor block further comprises a second contact face that is substantially flat and that extends orthogonally with respect to a longitudinal axis of the tendon, the second contact face being adapted to oppose so as to engage an interior facing rear wall of the chamber located on an opposite chamber side to the opening.

21. A connector as claimed in claim 14, wherein grout can be located, in use, within the chamber to surround and capture the enlarged formation such that a lateral and/or longitudinal movement of the second surface relative to the first surface is restricted.

22. A connector system suitable for use in forming a joint between a first surface in the form of a cast section, slab or plate and a second surface in the form of a cast section, slab or plate, the connector system comprising a housing and a tendon,
a first portion of the tendon being retained within the housing, and
a second portion of the tendon protruding from the housing through a seal, the seal being configured to sealably cover an open end of the housing such that, the tendon can move through the seal and laterally sideways across the open end together with at least a portion of the seal,
wherein the seal comprises a sleeve and a sealing element that is configured to be retained within the sleeve so that the sleeve peripherally surrounds the sealing element, the sleeve being affixed at the open end of the housing, such that the lateral movement of the tendon causes the sealing element to be laterally displaced within and relative to the sleeve, and
wherein the sealing element comprises a flat plate that is configured to move laterally with the tendon in use, and
wherein the tendon first portion has a configuration such that the tendon first portion cannot pass out of the housing via the seal.

23. A connector system as claimed in claim 22, wherein the seal comprises a sealing element that is configured to be retained within a sleeve, the sleeve being affixed at the open end of the housing, such that the lateral movement of the tendon causes the sealing element to be laterally displaced within and relative to the sleeve.

24. A method of installing a connector that is suitable for use in forming a joint between a first surface in the form of a cast section, slab or plate and a second surface in the form of a cast section, slab or plate, the connector comprising a housing and a tendon, wherein a seal is configured to sealably cover an open end of the housing, the seal being further configured such that, in use when forming a joint between the first and second surfaces, when installed and prior to locking, the tendon can move through the seal and laterally sideways across the open end together with at least a portion of the seal, wherein the seal comprises a sleeve and a sealing element that is configured to be retained within the sleeve so that the sleeve peripherally surrounds the sealing element. the sleeve being affixed at the open end of the housing, such that the lateral movement of the tendon causes the sealing element to be laterally displaced within and relative to the sleeve, and wherein the sealing element comprises a flat plate that is configured to move laterally with the tendon in use, the method comprising installing the housing such that the seal locates adjacent to a formwork;

pouring and curing the first surface, the first surface being located along a first side of the removable formwork;

removing the formwork such that the seal is exposed; and installing the tendon such that a portion of the tendon protrudes from the housing through the seal;

pouring and curing the second surface, the second surface being located along a side of the first surface from which the tendon protrudes.

25. A method of installing a connector as claimed in claim 24, wherein the method further comprises allowing the first and second surfaces to move laterally and/or longitudinally relative to one another, the housing being captive to and moved by the first surface, and the portion of the tendon that protrudes from the housing through the seal being captive to and moved by the second surface.

26. A method of installing a connector as claimed in claim 24, wherein the method further comprises locking the connector such that the first and second surfaces are restricted from moving laterally and/or longitudinally relative to one another.

27. A method of installing a connector as claimed in claim 24, wherein the seal comprises a sealing element that is configured to be retained within a sleeve, the sleeve being affixed at the open end of the housing, such that the lateral movement of the tendon causes the sealing element to be laterally displaced within and relative to the sleeve.

* * * * *